(12) United States Patent
Ide

(10) Patent No.: US 11,610,148 B2
(45) Date of Patent: Mar. 21, 2023

(54) INFORMATION PROCESSING DEVICE AND INFORMATION PROCESSING METHOD

(71) Applicant: SONY CORPORATION, Tokyo (JP)

(72) Inventor: Naoki Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 942 days.

(21) Appl. No.: 16/329,303

(22) PCT Filed: Aug. 18, 2017

(86) PCT No.: PCT/JP2017/029691
§ 371 (c)(1),
(2) Date: Feb. 28, 2019

(87) PCT Pub. No.: WO2018/079020
PCT Pub. Date: May 3, 2018

(65) Prior Publication Data
US 2019/0244132 A1    Aug. 8, 2019

(30) Foreign Application Priority Data

Oct. 26, 2016 (JP) ................................. 2016-209332

(51) Int. Cl.
*G06K 9/62* (2022.01)
*G06N 3/08* (2006.01)
(Continued)

(52) U.S. Cl.
CPC ............. *G06N 20/00* (2019.01); *G06F 17/18* (2013.01); *G06K 9/6223* (2013.01);
(Continued)

(58) Field of Classification Search
CPC .... G06N 20/00; G06N 3/0454; G06N 3/0472; G06N 3/088; G06N 20/10; G06F 17/18;
(Continued)

(56) References Cited

U.S. PATENT DOCUMENTS 7,412,425 B2* 8/2008 Rifkin .................. G06K 9/6252
706/12
7,740,547 B2* 6/2010 Nanba ................ A63B 37/0043
473/376
(Continued)

FOREIGN PATENT DOCUMENTS

WO    2015/033431 A1    3/2015

OTHER PUBLICATIONS

International Search Report and Written Opinion of PCT Application No. PCT/JP2017/029691, dated Oct. 10, 2017, 06 pages of ISRWO.

(Continued)

*Primary Examiner* — Sheela C Chawan
(74) *Attorney, Agent, or Firm* — Chip Law Group

(57) ABSTRACT

To previously predict learning performance in accordance with the labeling status of learning data. Provided is an information processing device including a data distribution presentation unit that performs dimensionality reduction on input learning data to generate a data distribution diagram related to the learning data, a learning performance prediction unit that predicts learning performance on the basis of the data distribution diagram and a labeling status related to the learning data, and a display control unit that controls a display related to the data distribution diagram and the learning performance. The data distribution diagram includes overlap information about clusters including the learning data and information about the number of pieces of the learning data belonging to each of the clusters.

19 Claims, 22 Drawing Sheets

(51) Int. Cl.
  *G06N 20/00* (2019.01)
  *G06F 17/18* (2006.01)
  *G06N 3/088* (2023.01)
  *G06N 3/04* (2023.01)
  *G06N 20/10* (2019.01)

(52) U.S. Cl.
  CPC ......... *G06K 9/6256* (2013.01); *G06K 9/6267* (2013.01); *G06N 3/0454* (2013.01); *G06N 3/0472* (2013.01); *G06N 3/088* (2013.01); *G06N 20/10* (2019.01)

(58) Field of Classification Search
  CPC ... G06K 9/6223; G06K 9/6256; G06K 9/6267
  USPC .......................... 706/12, 52, 45, 46; 382/100
  See application file for complete search history.

(56) References Cited

U.S. PATENT DOCUMENTS

| | | | | |
|---|---|---|---|---|
| 2007/0150802 | A1* | 6/2007 | Wan | G06F 16/35 707/999.1 |
| 2010/0063948 | A1* | 3/2010 | Virkar | G06N 20/10 707/769 |
| 2010/0174670 | A1* | 7/2010 | Malik | G06F 16/35 706/12 |
| 2010/0274539 | A1 | 10/2010 | Virkar et al. | |
| 2011/0289026 | A1* | 11/2011 | Kannan | G06Q 30/00 707/E17.014 |
| 2013/0080369 | A1* | 3/2013 | Zadeh | G06N 20/00 706/47 |
| 2013/0132310 | A1* | 5/2013 | Lespinats | G06N 20/00 706/12 |
| 2016/0125292 | A1* | 5/2016 | Seo | G06N 20/00 706/59 |

OTHER PUBLICATIONS

Takeuchi, et al., "A Method of Protein Function Information Sentence Extraction Using Instance Selection with Distance Metric Learning", IPSJ SIG Notes, Feb. 26, 2009, vol. 2009, Issue 25, pp. 9-12.

* cited by examiner

|  | Cluster A | Cluster B | Cluster C |
|---|---|---|---|
| Cluster A | 80 | 10 | 0 |
| Cluster B | 10 | 40 | 0 |
| Cluster C | 0 | 0 | 60 |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/029691 filed on Aug. 18, 2017, which claims priority benefit of Japanese Patent Application No. JP 2016-209332 filed in the Japan Patent Office on Oct. 26, 2016. Each of the above-referenced applications is hereby incorporated herein by reference in its entirety.

TECHNICAL FIELD

The present disclosure relates to an information processing device and an information processing method.

BACKGROUND ART

In recent years, in the machine learning field, research and development through use of various algorithms is being performed. In the above-described algorithms, a technique such as semi-supervised learning, for example, using both of labeled learning data and unlabeled learning data as inputs also exists. Non-Patent Literature 1 reports an example where semi-supervised learning is used for recognition of hand-written numeric data.

CITATION LIST

Non-Patent Literature

Non-Patent Literature 1: Diederik P. Kingma and three others, "Semi-supervised Learning with Deep Generative Models", Oct. 31, 2014, [Online], [retrieved on Sep. 7, 2016], the Internet <https://arxiv.org/pdf/1406.5298v2.pdf>

DISCLOSURE OF INVENTION

Technical Problem

However, in general, for semi-supervised learning as described in Non-Patent Literature 1, there is a concern about deterioration of learning performance due to the absence of labeling as compared with supervised learning of learning upon labeling all pieces of data. Further, in semi-supervised learning as described above, it is difficult to previously predict to what degree learning performance will deteriorate. Therefore, in the case of pursuing an improvement of performance, it is also supposed to label all pieces of data after all.

Thus, the present disclosure proposes a novel and improved device capable of previously predicting learning performance in accordance with the labeling status of learning data.

Solution to Problem

According to the present disclosure, there is provided an information processing device including: a data distribution presentation unit configured to perform dimensionality reduction on input learning data to generate a data distribution diagram related to the learning data; a learning performance prediction unit configured to predict learning performance on the basis of the data distribution diagram and a labeling status related to the learning data; and a display control unit configured to control a display related to the data distribution diagram and the learning performance. The data distribution diagram includes overlap information about clusters including the learning data and information about the number of pieces of the learning data belonging to each of the clusters.

In addition, according to the present disclosure, there is provided an information processing method including: performing, by a processor, dimensionality reduction based on input learning data to generate a data distribution diagram related to the learning data; predicting, by the processor, learning performance on the basis of the data distribution diagram and a labeling status related to the learning data; and controlling, by the processor, a display related to the data distribution diagram and the learning performance. The data distribution diagram includes overlap information about clusters including the learning data and information about the number of pieces of the learning data belonging to each of the clusters.

Advantageous Effects of Invention

According to the present disclosure as described above, it is possible to previously predict learning performance in accordance with labeling of learning data.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
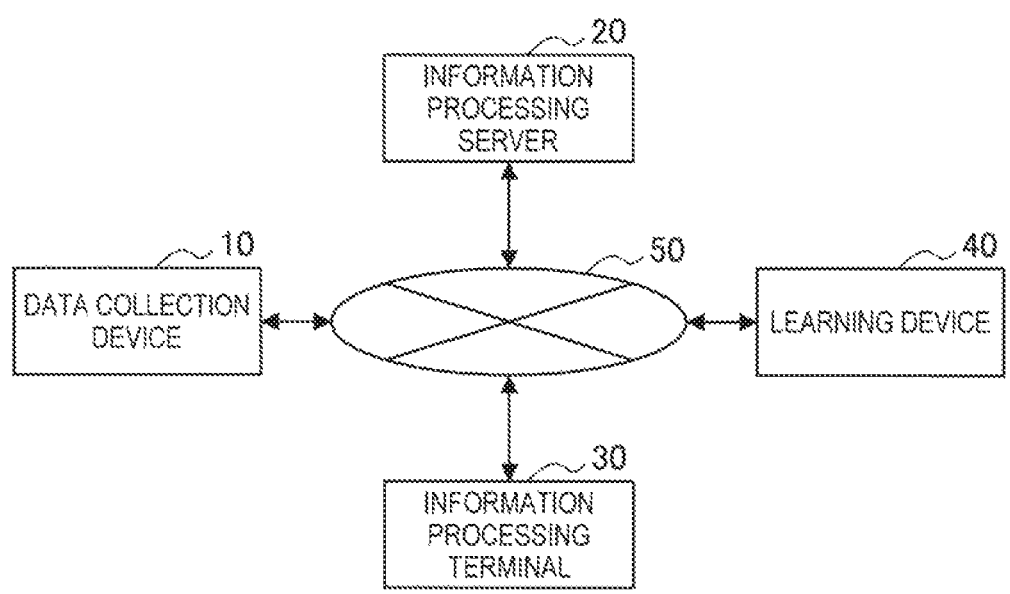
FIG. 1 is a diagram showing an exemplary configuration of an information processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First Embodiment
1.1. Overview of first embodiment
1.2. Exemplary system configuration
1.3. Exemplary functional configuration of data collection device 10
1.4. Exemplary functional configuration of information processing server 20
1.5. Exemplary functional configuration of information processing terminal 30
1.6. Exemplary functional configuration of learning device 40
1.7. Processing of data set
1.8. Generation of data distribution diagram
1.9. Selection of labeling candidates
1.10. Execution of labeling
1.11. Prediction of learning performance
1.12. Learning based on learning data
1.13. Effects of semi-supervised learning according to present embodiment
1.14. Flow of operation of information processing server 20
2. Second Embodiment
2.1. Overview of second embodiment
2.2. Exemplary functional configuration of information processing server 20
2.3. Determination about whether or not labeling is necessary
2.4. Flow of operation of information processing server 20
3. Exemplary hardware configuration
4. Conclusion

1. First Embodiment

<<1.1. Overview of First Embodiment>>

First, an overview of a first embodiment of the present disclosure will be described. As described above, in recent years, learning through use of various algorithms is performed along with the development of the information processing technology. For example, relatively high learning performance is expected in supervised learning in which labeled learning data is used for all inputs, but the burden of labeling will also increase in proportion to the amount of input learning data.

On the other hand, in semi-supervised learning, it is possible to reduce the burden of labeling as compared with supervised learning by using labeled learning data and unlabeled learning data as inputs. In semi-supervised learning, however, it is not clear to what degree performance deteriorates as compared with the case of labeling all pieces of learning data, and thus, it is difficult to grasp the amount of labeled data necessary for ensuring target performance.

In addition, in active learning, it is possible to present learning data predicted to contribute to performance improvement, that is, learning data that should be labeled, but this case is premised on that a recognizer has been completed to some degree. On the other hand, since a recognizer has not been generated in the case where only collection of learning data is performed first, and then labeling is performed, it is not possible to present learning data that should be labeled.

An information processing device and an information processing method according to the present embodiment have been devised with attention focused on the above-described points, and can predict learning performance related to a labeling status of learning data. Therefore, the information processing device according to the present embodiment has a function of performing dimensionality reduction based on input learning data to generate a data distribution diagram related to the learning data. In addition, the information processing device according to the present embodiment has a function of predicting learning performance on the basis of the data distribution diagram and the labeling status related to learning data. In addition, one of characteristics of the data distribution diagram according to the present embodiment lies in that overlap information about clusters including learning data and the number of pieces of learning data belonging to each of the clusters or distribution information are included. The information processing device and the information processing method according to the present embodiment can minimize the burden related to labeling by previously predicting an improvement in learning performance associated with labeling.

<<1.2. Exemplary System Configuration>>

Next, an exemplary system configuration according to the present embodiment will be described. FIG. 1 is a diagram showing an exemplary configuration of an information processing system according to the present embodiment. Referring to FIG. 1, the information processing system according to the present embodiment may include a data collection device 10, an information processing server 20, an information processing terminal 30, and a learning device 40. In addition, the information processing server 20, the data collection device 10, the information processing terminal 30, and the learning device 40 are connected via a network 50 such that mutual information communication can be performed.

(Data Collection Device 10)

The data collection device 10 according to the present embodiment is a device that collects a data set input to the information processing server 20. The data collection device 10 according to the present embodiment may have a function of storing data sets input by a user, for example, or may have a function of dynamically collecting data sets from a network such as the Internet, for example, via the network 50.

In addition, the data collection device 10 according to the present embodiment may have a function of collecting various types of sensor information. In this case, the collected sensor information or information obtained by processing the sensor information may be used as the above-described data set.

The data collection device 10 according to the present embodiment can be defined as a device having any of the above-described functions. Therefore, the data collection device 10 according to the present embodiment may be a personal computer (PC), a mobile phone, a smartphone, a tablet, a wearable device, or the like. In addition, the data collection device 10 according to the present embodiment may include various sensor devices having the function of collecting sensor information.

(Information Processing Server 20)

The information processing server 20 according to the present embodiment is an information processing device having a function of predicting learning performance of the learning device 40 from data sets collected by the data collection device 10. More specifically, the information processing server 20 according to the present embodiment has a function of generating a data distribution diagram from learning data based on data sets collected by the data collection device 10. In addition, as described above, the information processing server 20 according to the present embodiment has a function of predicting learning performance of the learning device 40 on the basis of the generated data distribution diagram and the labeling status related to learning data. In addition, the information processing server 20 according to the present embodiment has a function of exerting display control related to the above-described data distribution diagram and the predicted learning performance.

(Information Processing Terminal 30)

The information processing terminal 30 according to the present embodiment has a function of presenting the above-described data distribution diagram and the predicted learning performance to a user on the basis of control exerted by the information processing server 20. In addition, the information processing terminal 30 according to the present embodiment has functions of accepting an input manipulation made by the user and transmitting information related to the input manipulation to the information processing server 20. That is, the information processing terminal 30 according to the present embodiment is an information processing device that provides the user with a user interface related to labeling of learning data and learning. The information processing terminal 30 according to the present embodiment may be a PC, a smartphone, a tablet, or the like, for example.

(Learning Device 40)

The learning device 40 according to the present embodiment has a function of performing learning based on learning data. The learning device 40 according to the present embodiment may perform semi-supervised learning by means of a neural network (deep learning), for example. In addition, the learning device 40 according to the present embodiment may perform domain adaptation, transfer learning, weakly supervised learning, or the like. The learning device 40 according to the present embodiment has a function of recording or outputting a model obtained by learning as described above.

(Network 50)

The network 50 has a function of connecting each of the devices described above and the information processing server 20. The network 50 may include a public network such as the Internet, a telephone network, or a satellite communication network, various local area networks (LAN) including Ethernet (registered trademark), wide area networks (WAN), or the like. In addition, the network 50 may include a dedicated network such as Internet Protocol-Virtual Private Network (IP-VPN). In addition, the network 50 may include a wireless communication network such as Wi-Fi (registered trademark) or Bluetooth (registered trademark).

An exemplary configuration of the information processing system according to the present embodiment has been described above. Note that, in the above description through use of FIG. 1, the case where the data collection device 10, the information processing server 20, the information processing terminal 30, and the learning device 40 are implemented as independent information processing devices, respectively, has been described as an example, whilst the configuration of the information processing system according to the present embodiment is not limited to such an example. For example, the information processing server 20 according to the present embodiment may include any or all of the functions that the data collection device 10, the information processing terminal 30, and the learning device 40 have. For example, the information processing server 20 according to the present embodiment may be implemented as an information processing device having the data collection function, learning performance predicting function, and learning function.

On the other hand, the respective functions that the information processing server 20 according to the present embodiment has may be implemented by two or more information processing devices. The exemplary system configuration according to the present embodiment may be deformed flexibly in accordance with properties of information to be handled, system specifications, operating conditions, or the like.

<<1.3. Exemplary Functional Configuration of Data Collection Device 10>>

Figure 2:
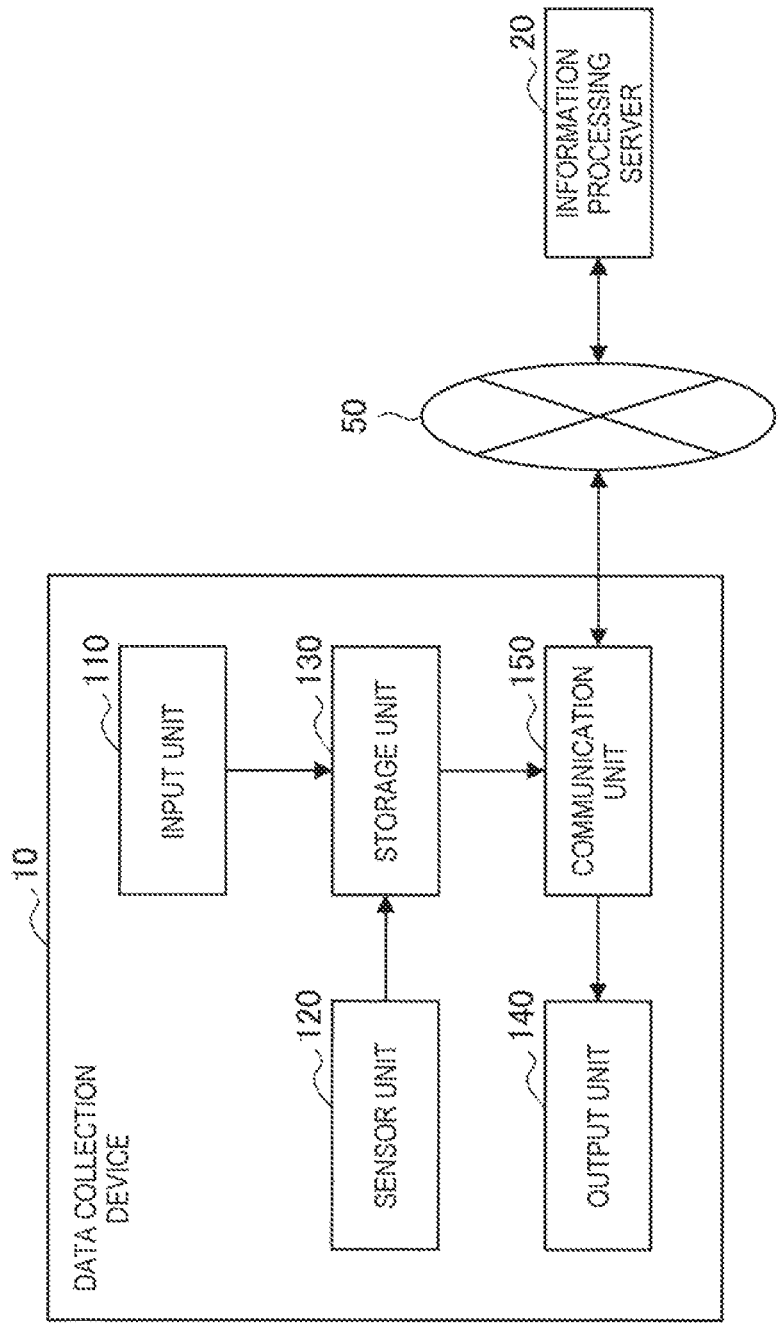
FIG. 2 is a functional block diagram of a data collection device 10 according to the embodiment.

Next, an exemplary functional configuration of the data collection device 10 according to the present embodiment will be described in detail. FIG. 2 is a functional block diagram of the data collection device 10 according to the present embodiment. Referring to FIG. 2, the data collection device 10 according to the present embodiment includes an input unit 110, a sensor unit 120, a storage unit 130, an output unit 140, and a communication unit 150. Hereinafter, each of the components indicated above will be described mainly regarding features that the components have.

(Input Unit 110)

The input unit 110 has a function of accepting an input manipulation made by the user. The input unit 110 according to the present embodiment accepts input of a data set made by the user, for example, and delivers the data set to the storage unit 130. The input unit 110 may be implemented by various buttons, a keyboard, a touch panel, a mouse, a switch, or the like, for example. In addition, the input unit 110 may include a microphone or the like.

(Sensor Unit 120)

The sensor unit 120 has a function of collecting various types of sensor information to be used as learning data. Therefore, the sensor unit 120 according to the present embodiment may include a global positioning system (GPS), Wi-Fi, an acceleration sensor, a gyro sensor, a geomagnetic sensor, an image sensor, a microphone, various radars and optical sensors, a clock, or the like, for example. Note that the sensor unit 120 according to the present embodiment may include a sensor other than those described above. The sensor unit 120 according to the present embodiment may include a sensor in accordance with data sets to be collected. In addition, the sensor unit 120 delivers the collected sensor information to the storage unit 130.

(Storage Unit 130)

The storage unit 130 has a function of storing a data set delivered from the input unit 110 or the sensor unit 120.

(Output Unit 140)

The output unit 140 has a function of presenting visual information or audible information to the user. Therefore, the output unit 140 may include a display device or a speaker, for example. Here, the above-described display device may be implemented by a cathode ray tube (CRT) display device, a liquid crystal display (LCD) device, an organic light emitting diode (OLED) device, a touch panel, a projector, or the like, for example.

(Communication Unit 150)

The communication unit 150 has a function of performing information communication with the information processing server 20. Specifically, the communication unit 150 according to the present embodiment transmits a data set stored in the storage unit 130 to the information processing server 20. In addition, the communication unit 150 the information processing server 20 may perform information communication with a device other than the information processing server 20. For example, the communication unit 150 may dynamically collect data sets from a network on the basis of control exerted by a control unit (not shown).

An exemplary functional configuration of the data collection device 10 according to the present embodiment has been described above. Note that the functional configuration described above is merely an example, and the configuration of the data collection device 10 according to the present embodiment is not limited to the example described using FIG. 2. The data collection device 10 according to the present embodiment may include a control unit that controls each component, for example. In addition, the data collection device 10 may not include some of the components shown in FIG. 2. The configuration of the data collection device 10 according to the present embodiment may be deformed flexibly in accordance with properties of learning data to be collected.

<<1.4. Exemplary Functional Configuration of Information Processing Server 20>>

Figure 3:
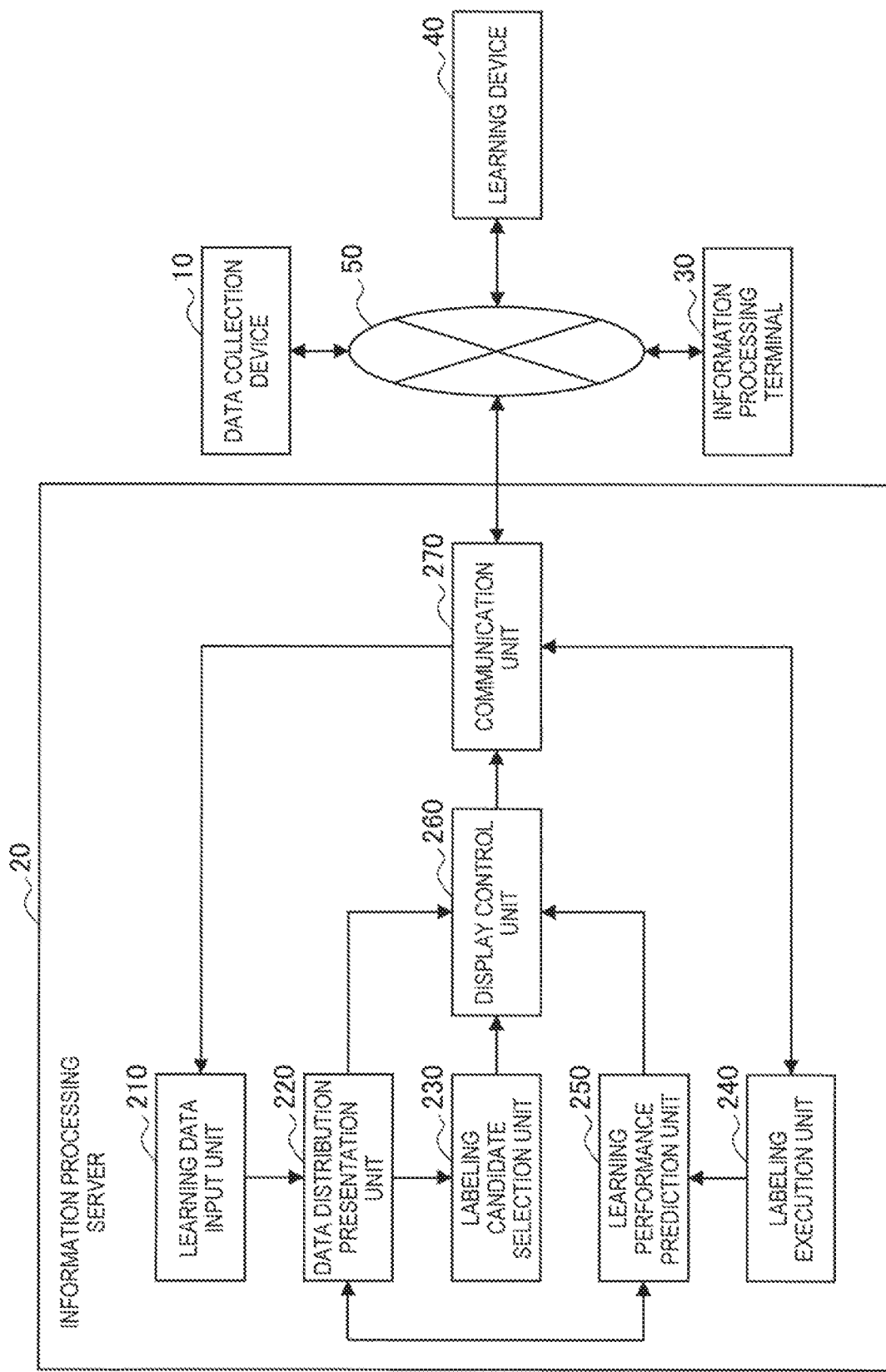
FIG. 3 is a functional block diagram of an information processing server 20 according to the embodiment.

Next, an exemplary functional configuration of the information processing server 20 according to the present embodiment will be described. FIG. 3 is a functional block diagram of the information processing server 20 according to the present embodiment. Referring to FIG. 3, the information processing server 20 according to the present embodiment includes a learning data input unit 210, a data distribution presentation unit 220, a labeling candidate selection unit 230, a labeling execution unit 240, a learning performance prediction unit 250, a display control unit 260, and a communication unit 270. Hereinafter, an overview of each of the components indicated above will be described.

(Learning Data Input Unit 210)

The learning data input unit 210 has a function of inputting data sets collected by the data collection device 10 to the data distribution presentation unit as learning data. Functional details of the learning data input unit 210 according to the present embodiment will be described later separately.

(Data Distribution Presentation Unit 220)

The data distribution presentation unit 220 has a function of performing dimensionality reduction on learning data input by the learning data input unit 210 to generate a data distribution diagram related to the learning data. Note that a diagram obtained by projecting and plotting high-dimensional data on low-dimensional data as well as a chart indicating clusters including learning data and the degree of overlap between clusters may be included in the data distribution diagram according to the present embodiment. Note that, in the case where learning data having already been labeled exists, the data distribution presentation unit 220 may distinguish between learning data having been labeled and learning data not having been labeled by performing coloring in accordance with assigned labels. Functional details of the data distribution presentation unit 220 according to the present embodiment will be described later separately.

(Labeling Candidate Selection Unit 230)

The labeling candidate selection unit 230 has a function of selecting labeling candidates from learning data on the basis of the data distribution diagram generated by the data distribution presentation unit 220. That is, the labeling candidate selection unit 230 according to the present embodiment can select learning data predicted to produce a significant effect of performance improvement by labeling. Note that, in the case where learning data having been already labeled exists, the labeling candidate selection unit 230 can select labeling candidates taking the learning data into account. Functional details of the labeling candidate selection unit 230 according to the present embodiment will be described later separately.

(Labeling Execution Unit 240)

The labeling execution unit 240 has a function of, on the basis of learning data selected in the data distribution diagram displayed on an output unit 320 of the information processing terminal 30 and an input value, performing labeling of the learning data.

(Learning Performance Prediction Unit 250)

The learning performance prediction unit 250 has a function of, on the basis of the data distribution diagram and the labeling status related to learning data, predicting learning performance achieved by the learning device 40. On this occasion, the learning performance prediction unit 250 according to the present embodiment can predict the above-described learning performance by determining whether or not labeled learning data exists in each cluster and whether or not an overlap between clusters has occurred. Functional details of the learning performance prediction unit 250 according to the present embodiment will be described later separately.

(Display Control Unit 260)

The display control unit 260 has a function of controlling display related to the data distribution diagram generated by the data distribution presentation unit 220 and learning performance predicted by the learning performance prediction unit 250. In addition, the display control unit 260 according to the present embodiment has a function of exerting display control related to the labeling candidates selected by the labeling candidate selection unit 230 or learning data selected by the user. That is, the display control unit 260 according to the present embodiment controls a display of the user interface displayed on the information processing terminal 30. Functional details of the display control unit 260 according to the present embodiment will be described later separately.

(Communication Unit 270)

The communication unit 270 has a function of performing information communication with the data collection device 10, the information processing terminal 30, and the learning device 40. Specifically, the communication unit 270 according to the present embodiment receives data sets collected by the data collection device 10. In addition, the communication unit 270 transmits a control signal generated by the display control unit 260 to the information processing terminal 30, and receives user input information from the information processing terminal 30. In addition, the communication unit 270 transmits learning data to the learning device 40.

An exemplary functional configuration of the information processing server 20 according to the present embodiment has been described above. Note that the functional configuration described above is merely an example, and the configuration of the information processing server 20 according to the present embodiment is not limited to the example described using FIG. 3. As described above, the information processing server 20 according to the present embodiment may include any or all of the functions that the data collection device 10, the information processing terminal 30, and the learning device 40 have.

In addition, some of the components included in the information processing server 20 can be implemented as functions of another device. For example, the data distribution presentation unit 220 and the learning performance prediction unit 250 may be implemented as functions of another device different from the information processing server 20. In addition, the information processing server 20 according to the present embodiment may further include components other than those described above. The functional configuration of the information processing server 20 according to the present embodiment may be deformed flexibly.

<<1.5. Exemplary Functional Configuration of Information Processing Terminal 30>>

Figure 4:
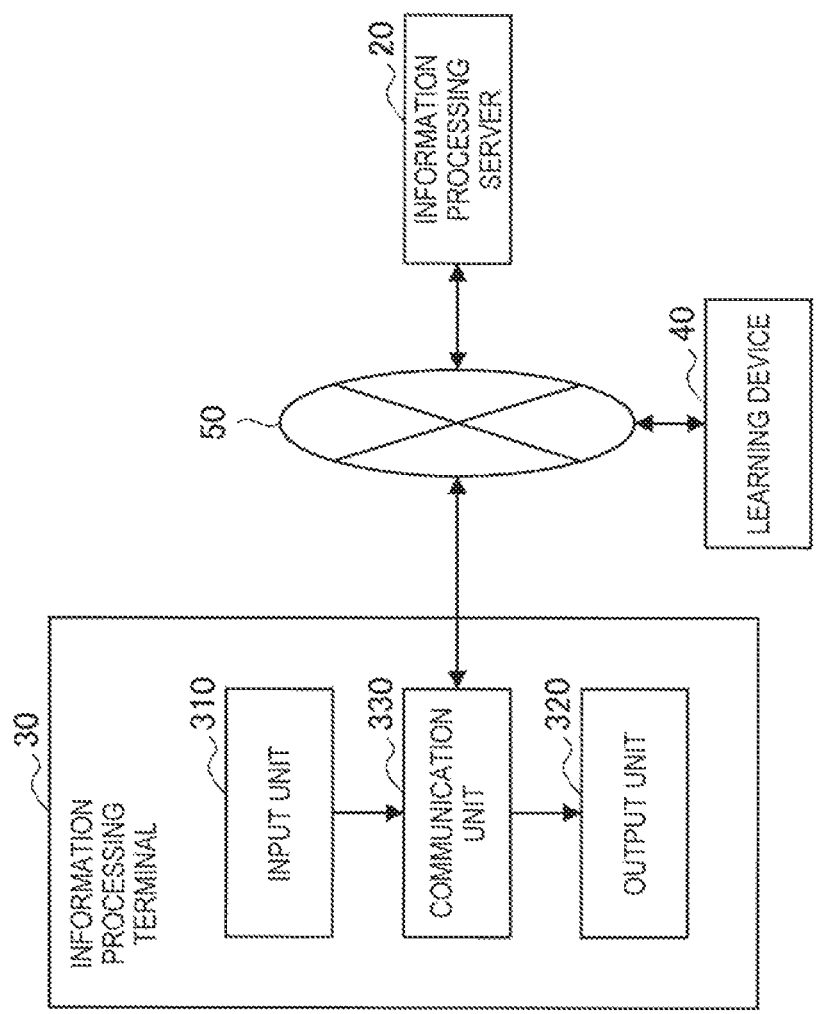
FIG. 4 is a functional block diagram of an information processing terminal 30 according to the embodiment.

Next, an exemplary functional configuration of the information processing terminal 30 according to the present embodiment will be described in detail. FIG. 4 is a functional block diagram of the information processing terminal 30 according to the present embodiment. Referring to FIG. 4, the information processing terminal 30 according to the present embodiment includes an input unit 310, the output unit 320, and a communication unit 330.

(Input Unit 310)

The input unit 310 has a function of accepting an input manipulation made by the user. The input unit 310 according to the present embodiment accepts a manipulation of selecting learning data or a manipulation of inputting a label made by the user, for example. In addition, the input unit 310 may accept a model structure or parameter related to learning performed by the learning device 40, or an input of another learning setting. The input unit 310 may be implemented by various buttons, a keyboard, a touch panel, a mouse, a switch, or the like, for example.

(Output Unit 320)

The output unit 320 has a function of providing the user with a user interface related to labeling of learning data and learning. More specifically, the output unit 320 according to the present embodiment causes a data distribution diagram and learning performance to be displayed on the above-described user interface on the basis of control exerted by the information processing server 20. Therefore, the output unit 320 may include a display device. The above-described display device may be implemented by a CRT display device, a liquid crystal display device, an OLED device, a touch panel, a projector, or the like, for example. In addition, the output unit 320 according to the present embodiment may have a function of presenting audible information to the user. In this case, the output unit 320 includes a speaker or the like.

(Communication Unit 330)

The communication unit 330 has a function of performing information communication with the information processing server 20. Specifically, the communication unit 330 according to the present embodiment receives a control signal related to display control over the user interface from the information processing server 20. In addition, the communication unit 330 transmits information about learning data selected by the user or information about an input label to the information processing server 20. In addition, the communication unit 330 may transmit information related to an input learning setting to the learning device 40.

An exemplary functional configuration of the information processing terminal 30 according to the present embodiment has been described above. Note that the functional configuration described above is merely an example, and the configuration of the information processing terminal 30 according to the present embodiment is not limited to the example described using FIG. 4. The information processing terminal 30 according to the present embodiment may include a control unit that controls each component, for example. The configuration of the information processing terminal 30 according to the present embodiment may be deformed flexibly.

<<1.6. Exemplary Functional Configuration of Learning Device 40>>

Figure 5:
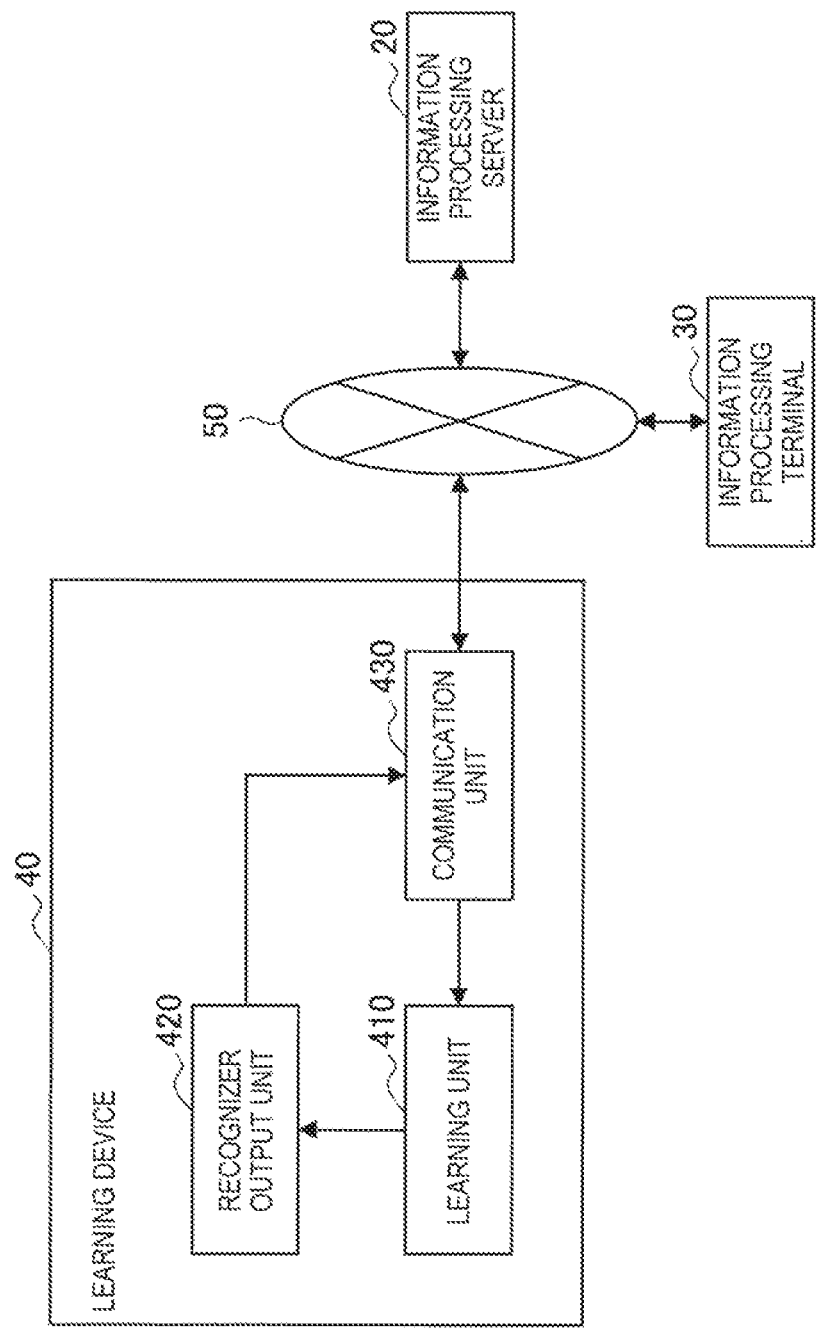
FIG. 5 is a functional block diagram of a learning device 40 according to the embodiment.

Next, an exemplary functional configuration of the learning device 40 according to the present embodiment will be described. FIG. 5 is a functional block diagram of the learning device 40 according to the present embodiment. Referring to FIG. 5, the learning device 40 according to the present embodiment includes a learning unit 410, a recognizer output unit 420, and a communication unit 430. Hereinafter, an overview of each of the components indicated above will be described.

(Learning Unit 410)

The learning unit 410 has a function of performing learning based on learning data. As described above, labeled learning data and unlabeled learning data may be included in the learning data according to the present embodiment. The learning unit 410 according to the present embodiment can perform semi-supervised learning, domain adaptation, weakly supervised learning, or the like based on the above-described learning data, for example. Note that a model structure or parameter related to learning or another learning setting may be input via the user interface displayed on the information processing terminal 30. Functional details of the learning unit 410 according to the present embodiment will be described later separately.

(Recognizer Output Unit 420)

The recognizer output unit 420 has a function of outputting a recognizer obtained as a result of learning performed by the learning unit 410. The recognizer output unit according to the present embodiment records the recognizer (model) structure, parameter, learning status, and the like in a memory, file, or the like.

(Communication Unit 430)

The communication unit 430 has a function of performing information communication with the information processing server 20. Specifically, the communication unit 430 according to the present embodiment receives learning data from the information processing server 20. In the case where learning data is stored in a separate storage device by the information processing server 20, the communication unit 430 may receive a path of the storage device or the like. In addition, the communication unit 430 may receive information related to a learning setting from the information processing terminal 30.

The exemplary functional configuration of the learning device 40 according to the present embodiment has been described above. Note that the functional configuration described above is merely an example, and the configuration of the learning device 40 according to the present embodiment is not limited to the example described using FIG. 5. The learning device 40 according to the present embodiment may include a control unit that controls each component, for example. The configuration of the learning device 40 according to the present embodiment may be deformed flexibly.

<<1.7. Processing of Data Sets>>

Next, details of functions that the learning data input unit 210 according to the present embodiment has will be described. As described above, the learning data input unit 210 according to the present embodiment has a function of inputting data sets collected by the data collection device 10 in the data distribution presentation unit as learning data. On this occasion, the learning data input unit 210 according to the present embodiment can carry out processing for the purpose of dimensionality reduction on collected data sets, and can input the data after processing in the data distribution presentation unit 220 as learning data. The learning data input unit according to the present embodiment can perform the above-described processing using a technique such as principal component analysis (PCA), autoencoder, or variational autoencoder (VAE), for example.

For example, the learning data input unit 210 may process a data set into a first main component, a second main component, and an N-th main component through PCA. In addition, for example, the learning data input unit 210 may input a data set to an autoencoder, and may input an output result to the data distribution presentation unit 220 as learning data. In addition, in the case of using VAE, an average parameter may be extracted from an output from an encoder, and the parameter may be handled as learning data. The learning data input unit 210 according to the present embodiment can carry out processing in accordance with a collected data set or a learning algorithm. Note that processing may not necessarily be performed by the learning data input unit 210 depending on characteristics of the data set or learning algorithm.

<<1.8. Generation of Data Distribution Diagram>>

Next, details of functions that the data distribution presentation unit 220 according to the present embodiment has will be described. As described above, the data distribution presentation unit 220 according to the present embodiment has a function of performing dimensionality reduction on learning data input by the learning data input unit 210 to generate a data distribution diagram related to the learning data. On this occasion, the data distribution presentation unit 220 according to the present embodiment may perform the above-described dimensionality reduction using a technique such as multi-dimentional scaling (MDS) or t-distributed stochastic neighbor embedding (tSNE).

For example, the data distribution presentation unit 220 according to the present embodiment can project the distance or similarity between pieces of data in a multi-dimensional space to a space of another dimension using MDS while maintaining a distance measure. In addition, for example, the data distribution presentation unit 220 according to the present embodiment may perform dimensionality reduction based on a distance measure of a probability distribution using tSNE.

Note that the data distribution presentation unit 220 can also perform dimensionality reduction using locally linear embedding (LLE), local tangent space alignment (LTSA), HessianLLE, ManiforLLe, Isomap, SpectralEmbedding, or the like, for example, besides the foregoing.

Figure 6A:
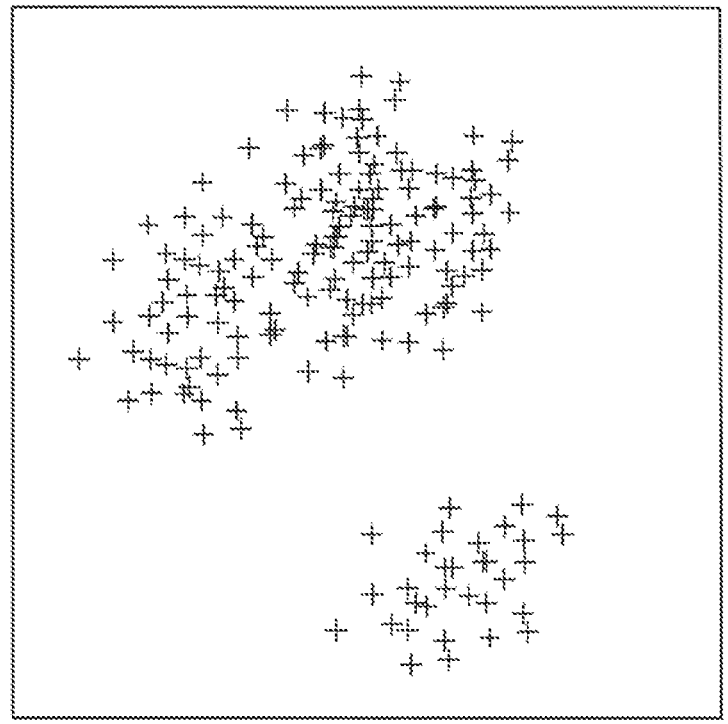
FIG. 6A is a diagram showing an example of a plot diagram of learning data generated by a data distribution presentation unit according to the embodiment.

FIG. 6A is a diagram showing an example of a plot diagram of learning data generated by dimensionality reduction processing performed by the data distribution presentation unit 220. As shown in FIG. 6A, the data distribution presentation unit 220 according to the present embodiment can plot learning data on a two-dimensional plane using tSNE or the like. In this manner, a plot diagram of learning data visualized by dimensionality reduction may be included in the data distribution diagram according to the present embodiment.

Note that the data distribution presentation unit 220 may generate a diagram through use of density estimation or the like besides a plot by means of points. In this case, the data distribution presentation unit 220 can generate a data distribution diagram to which density estimation lines as shown in FIG. 6B have been added.

Further, the data distribution presentation unit 220 may simplify density estimation processing to perform parametric distribution estimation. The data distribution presentation unit 220 can use Gaussian mixture distribution, k-means, or the like, for example. On this occasion, a mixture number in the Gaussian mixture distribution or a value of k in k-means may be set by the user.

Figure 6B:
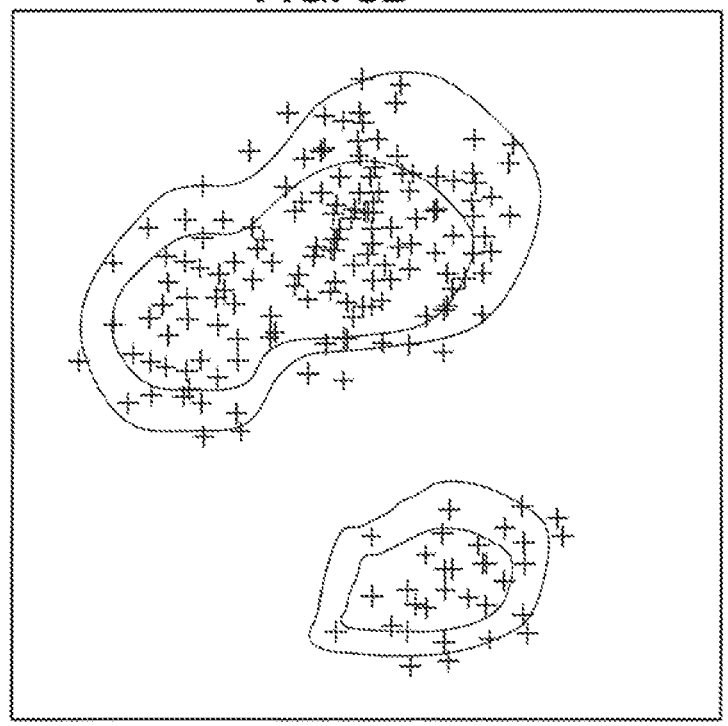
FIG. 6B is a diagram showing an example of a plot diagram of learning data generated by the data distribution presentation unit according to the embodiment.
Figures 7, 8:
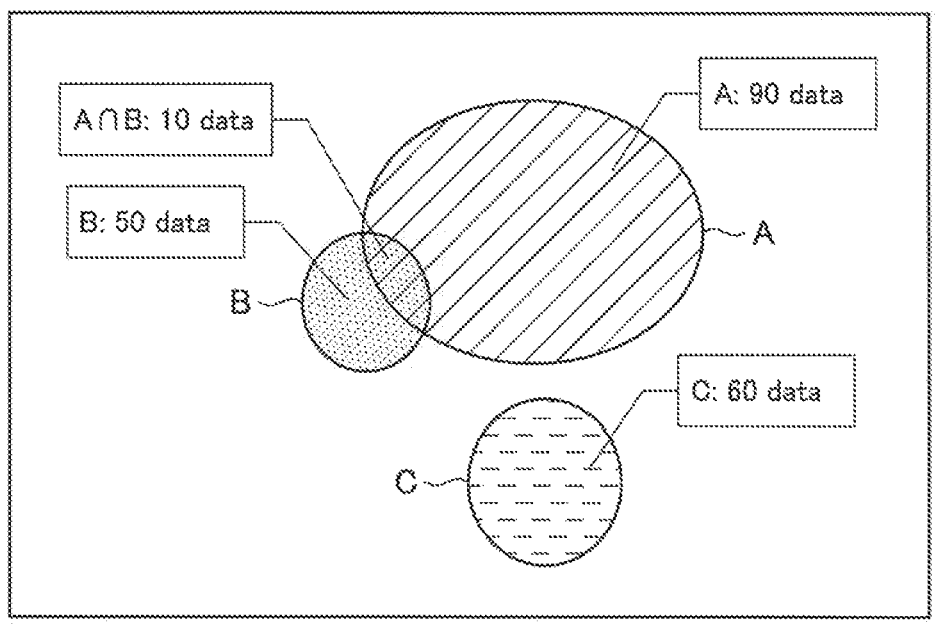
FIG. 7 is an example of a distribution image diagram generated by the data distribution presentation unit according to the embodiment.
FIG. 8 is an example of a distribution overlap table generated by the data distribution presentation unit according to the embodiment.

In addition, the data distribution presentation unit 220 according to the present embodiment can also generate a distribution image diagram obtained by simplifying plot diagrams as shown in FIG. 6A and FIG. 6B. FIG. 7 is an example of a distribution image diagram generated by the data distribution presentation unit 220. FIG. 7 shows a distribution image of learning data in the case where three clusters have been found on the two-dimensional plane through dimensionality reduction. Referring to FIG. 7, it is understood that the three clusters A to C include ninety, fifty, and sixth pieces of learning data, respectively. In addition, it is understood that the clusters A and B share ten pieces of learning data.

Further, the data distribution presentation unit 220 according to the present embodiment may generate a distribution overlap table obtained by compiling the number of pieces of learning data belonging to each cluster into a table. FIG. 8 is an example of the distribution overlap table generated by the data distribution presentation unit 220. As shown in FIG. 8, the distribution overlap table according to the present embodiment may be a table in which cluster Ids are located on the vertical axis and the horizontal axis, and the number of pieces of learning data belonging to a corresponding cluster is indicated at an intersection of the vertical axis and the horizontal axis.

For example, in FIG. 8, the number 80 is shown at the intersection of the cluster A (the vertical axis) and the cluster A (the horizontal axis), which represents that eighty pieces of learning data belonging only to the cluster A exist. In addition, in FIG. 8, the number 10 is shown at the intersection of the cluster A (the vertical axis) and the cluster B (the horizontal axis), which represents that ten pieces of learning data belonging to both of the clusters A and B exist.

The data distribution presentation unit 220 according to the present embodiment may generate a distribution overlap table as shown in FIG. 8 from data on a low-dimensional space, or may generate a distribution overlap table through calculation based on the distance on an original high-dimensional space.

As described above, the data distribution presentation unit 220 according to the present embodiment can perform dimensionality reduction on input learning data, and can generate a data distribution diagram related to the learning data. In addition, a plot diagram generated by dimensionality reduction, a distribution image diagram obtained by simplifying the plot diagram, a distribution overlap table obtained by compiling the number of pieces of learning data belonging to each cluster into a table, and the like may be included in the data distribution diagram according to the present embodiment. That is, the data distribution diagram according to the present embodiment can be defined as a diagram including overlap information about clusters including learning data and information about the number of pieces of learning data belonging to each cluster.

When the data distribution diagram generated by the data distribution presentation unit 220 according to the present embodiment is displayed on a user interface on the information processing terminal 30, it is possible for the user to visually grasp the distribution of learning data. Note that, on this occasion, the display control unit 260 may cause any data distribution diagram generated by the data distribution presentation unit 220 to be displayed on the output unit 320 of the information processing terminal 30, or may cause all data distribution diagrams to be displayed. In addition, the display control unit 260 may exert control of switching between presence and absence of a display of each data distribution diagram through a user manipulation.

<<1.9. Selection of Labeling Candidates>>

Next, details of functions that the labeling candidate selection unit 230 according to the present embodiment has will be described. As described above, the labeling candidate selection unit 230 according to the present embodiment has a function of selecting labeling candidates from learning data on the basis of the data distribution diagram generated by the data distribution presentation unit 220.

On this occasion, the labeling candidate selection unit 230 according to the present embodiment may select learning data positioned close to the center of gravity of a cluster in the data distribution diagram as labeling candidates. Being close to the center of gravity may not necessarily be strict. This is because it is expected that data close to the center of gravity is a label representing the cluster better than data close to the boundary. In addition, the display control unit 260 causes the labeling candidates selected by the labeling candidate selection unit 230 to be displayed on the output unit 320 of the information processing terminal 30.

Figure 9:
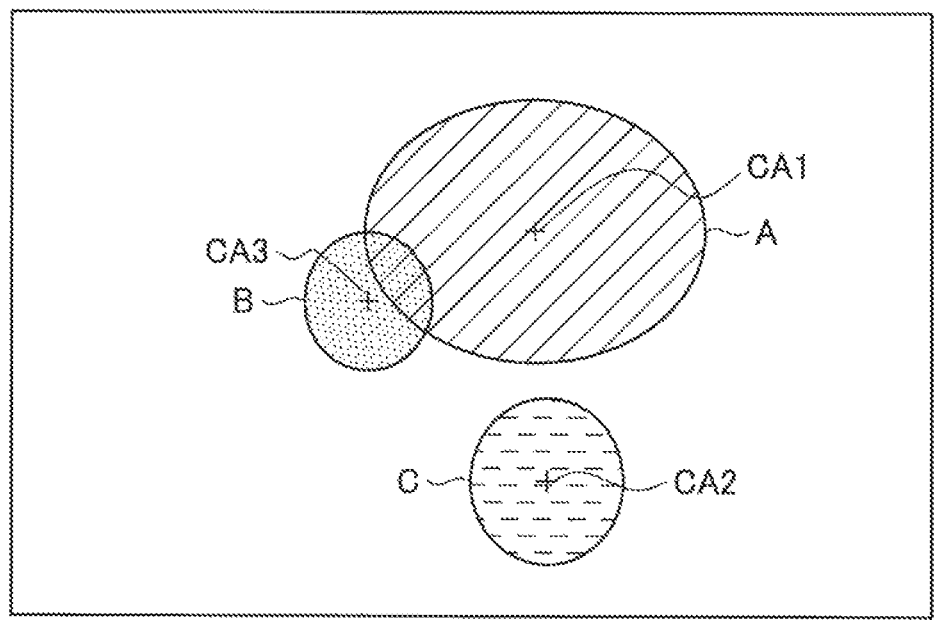
FIG. 9 is a diagram showing an example of labeling candidates displayed on an output unit on the basis of control exerted by a display control unit according to the embodiment.

FIG. 9 is a diagram showing an example of labeling candidates displayed on the output unit 320 on the basis of control exerted by the display control unit 260. FIG. 9 shows a data distribution diagram generated by the data distribution presentation unit 220. Here, the clusters A to C and labeling candidates CA1 to CA3 selected by the labeling candidate selection unit 230 in the clusters A to C are respectively shown in the data distribution diagram.

In this manner, the labeling candidate selection unit 230 according to the present embodiment can select learning data positioned close to the center of gravity of each cluster as labeling candidates. Note that, in the case where labeled learning data already exists in a cluster, the labeling candidate selection unit 230 may select learning data in a cluster where labeled learning data does not exist as labeling candidates by priority. The above-described functions that the labeling candidate selection unit 230 according to the present embodiment has enable the user to intuitively grasp learning data predicted as contributing to performance improvement.

In addition, in the case where labeled learning data exists in all the classes, the labeling candidate selection unit 230 according to the present embodiment may select learning data positioned closer to the vicinity of the boundary as labeling candidates. This is for acquiring a strict identification surface close to the boundary with the labeling candidate selection unit 230 according to the present embodiment selecting learning data predicted as having a high false recognition ratio as labeling candidates. The above-described functions that the labeling candidate selection unit 230 has enable more efficient labeling as performed in active learning to be achieved.

In addition, for example, in such a case where labeled learning data exists in a common portion of clusters, the labeling candidate selection unit 230 may select the learning data as labeling candidates. That is, the labeling candidate selection unit 230 may prompt the user to delete or reassign a label related to learning data that may be a factor of the false recognition ratio.

<<1.10. Execution of Labeling>>

Next, execution of labeling according to the present embodiment will be described in detail. As described above, the labeling execution unit 240 according to the present embodiment has a function of, on the basis of learning data selected in the data distribution diagram displayed on the output unit 320 and an input value, performing labeling of the learning data.

Figure 10:
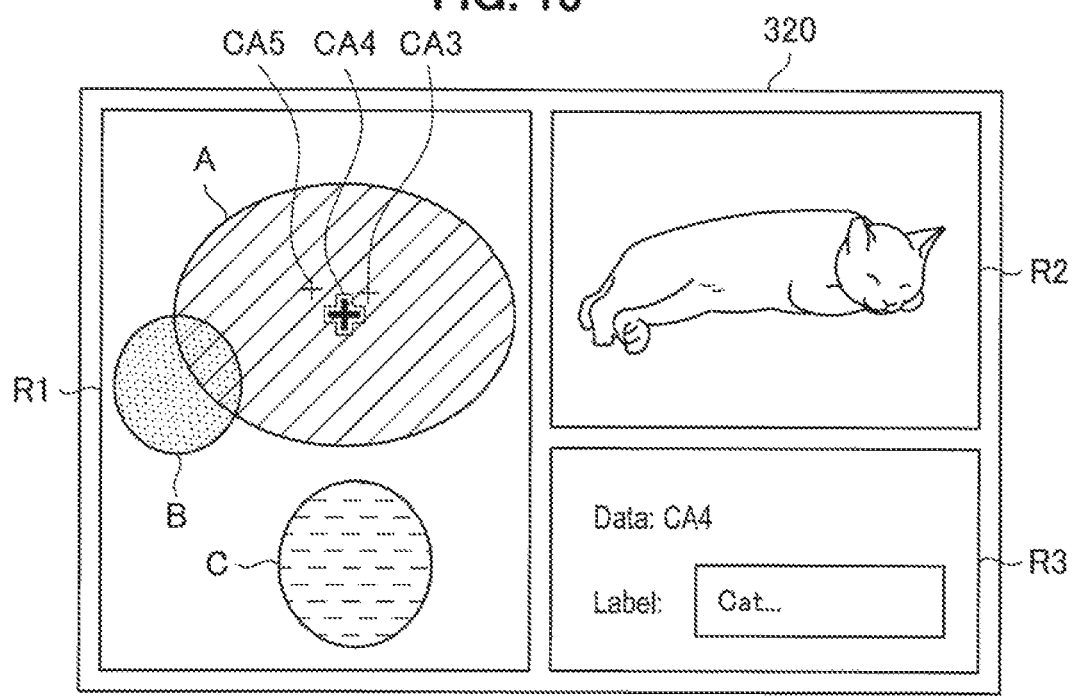
FIG. 10 is an example of a user interface displayed on an output unit of an information processing terminal according to the embodiment.

FIG. 10 is an example of a user interface IF1 displayed on the output unit 320 of the information processing terminal 30. The output unit 320 can display the user interface IF1 on the basis of control exerted by the display control unit 260. Referring to FIG. 10, the user interface IF1 according to the present embodiment includes three regions R1 to R3.

Here, the region R1 may be a region for displaying a data distribution diagram generated by the data distribution presentation unit 220. Referring to FIG. 10, a data distribution diagram including three clusters is shown in the region R1. In addition, labeling candidates CA4 to CA6 selected by the labeling candidate selection unit 230 are displayed together in the data distribution diagram. In this manner, the labeling candidate selection unit 230 according to the present embodiment may select a plurality of labeling candidates in a cluster.

In addition, the user may select learning data on which labeling is to be performed by a manipulation of his/her own in addition to the labeling candidates selected by the labeling candidate selection unit 230. In this case, learning data positioned close to a clicked point may be displayed as the labeling candidates CA4 to CA6 on the basis that the user has clicked a cluster in the data distribution diagram, for example. On this occasion, by subsequently clicking any piece of learning data again among the labeling candidates CA4 to CA6, the user can select learning data on which labeling is to be performed actually. Note that FIG. 10 shows an example of the case where the labeling candidate CA4 has been selected as an actual labeling target by the user or the labeling candidate selection unit 230.

On this occasion, on the basis of the selected learning data, the display control unit 260 according to the present embodiment can cause reference information corresponding to the learning data to be displayed on the output unit 320. In the region R2 of FIG. 10, reference information displayed on the basis of control exerted by the display control unit 260 is shown. Here, the reference information according to the present embodiment may be information for the user to grasp the contents of learning data. FIG. 10 shows an example of the case where reference information is an image of a cat. That is, the example shown in FIG. 10 indicates that, in the case where the learning device 40 performs a recognition task based on image information, the display control unit 260 presents an image indicating the contents of learning data to the user.

The above-described functions that the display control unit 260 according to the present embodiment has enable the user to grasp the contents of learning data and perform appropriate labeling by visually recognizing reference information displayed on the user interface IF1. In the example shown in FIG. 10, the user visually recognizes reference information displayed in the region R2, and inputs the label of learning data as "Cat" in the region R3. On this occasion, the user may make a free input, or may make a selection from a previously created list to perform labeling. The labeling execution unit 240 executes labeling of selected learning data on the basis of the input label.

Note that the reference information according to the present embodiment may be original data collected by the data collection device 10, or may be data obtained by carrying out appropriate processing on the basis of original data. For example, in the case where original data is image data, the reference information according to the present embodiment may be image data obtained by changing the resolution of the above-described original data, or may be image data having been subjected to trimming.

Figure 11:
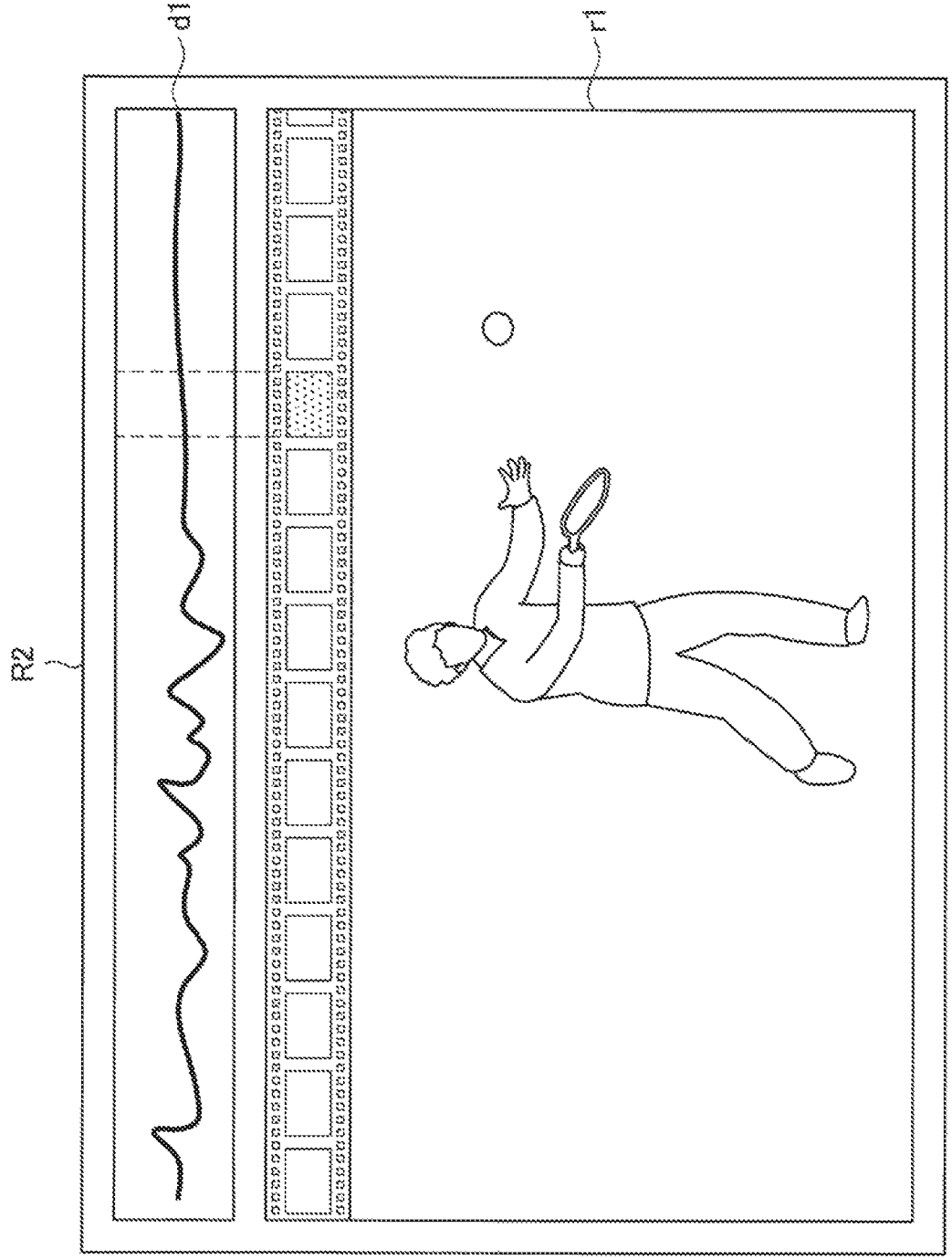
FIG. 11 is a diagram showing an example of the case where reference information according to the embodiment is sensor information.

In addition, the reference information according to the present embodiment is not limited to image information. For example, in the case where the learning device 40 performs a recognition task based on the collected sensor information, the reference information according to the present embodiment may be sensor information corresponding to the selected learning data. FIG. 11 is a diagram showing an example of the case where the reference information according to the present embodiment is sensor information. FIG. 11 shows reference information d1 displayed in the region R2 of the user interface IF1. Here, the reference information r1 may be waveform data indicating acceleration information, gyro information, geomagnetic information, barometric information, or the like, for example.

In addition, on this occasion, the display control unit 260 according to the present embodiment can cause accompanying data r1 synchronized with the reference information r1 to be displayed in association with the reference information d1, in addition to the reference information d1. In the example shown in FIG. 11, the accompanying data r1 may be video data temporally synchronized with the reference information d1 which is sensor information. That is, the display control unit 260 according to the present embodiment can cause video data recorded at the same time when collecting sensor information to be displayed on the user interface as accompanying data.

With the above-described functions that the display control unit 260 according to the present embodiment has, it is possible to assist in appropriate labeling performed by the user even in the case where learning data is data difficult for the user to grasp intuitively, such as sensor information.

Note that the foregoing describes the case of performing labeling on a single piece of learning data as an example, whilst the user interface IF1 according to the present embodiment also enables labeling to be performed on a plurality of pieces of learning data at the same time. In this case, the display control unit 260 according to the present embodiment can cause a plurality of pieces of reference information corresponding to a plurality of pieces of learning data selected by the user or the labeling candidate selection unit 230 to be displayed. In addition, it is possible for the user to check a plurality of pieces of reference information to be displayed, eliminate learning data to which different labels should be assigned, and then perform labeling on a remaining plurality of pieces of learning data at the same time.

<<1.11. Prediction of Learning Performance>>

Next, functional details of the learning performance prediction unit 250 according to the present embodiment will be described. As described above, the learning performance prediction unit 250 according to the present embodiment has a function of predicting learning performance of the learning device 40 on the basis of the data distribution diagram generated by the data distribution presentation unit 220 and the labeling status related to learning data.

Figure 12:
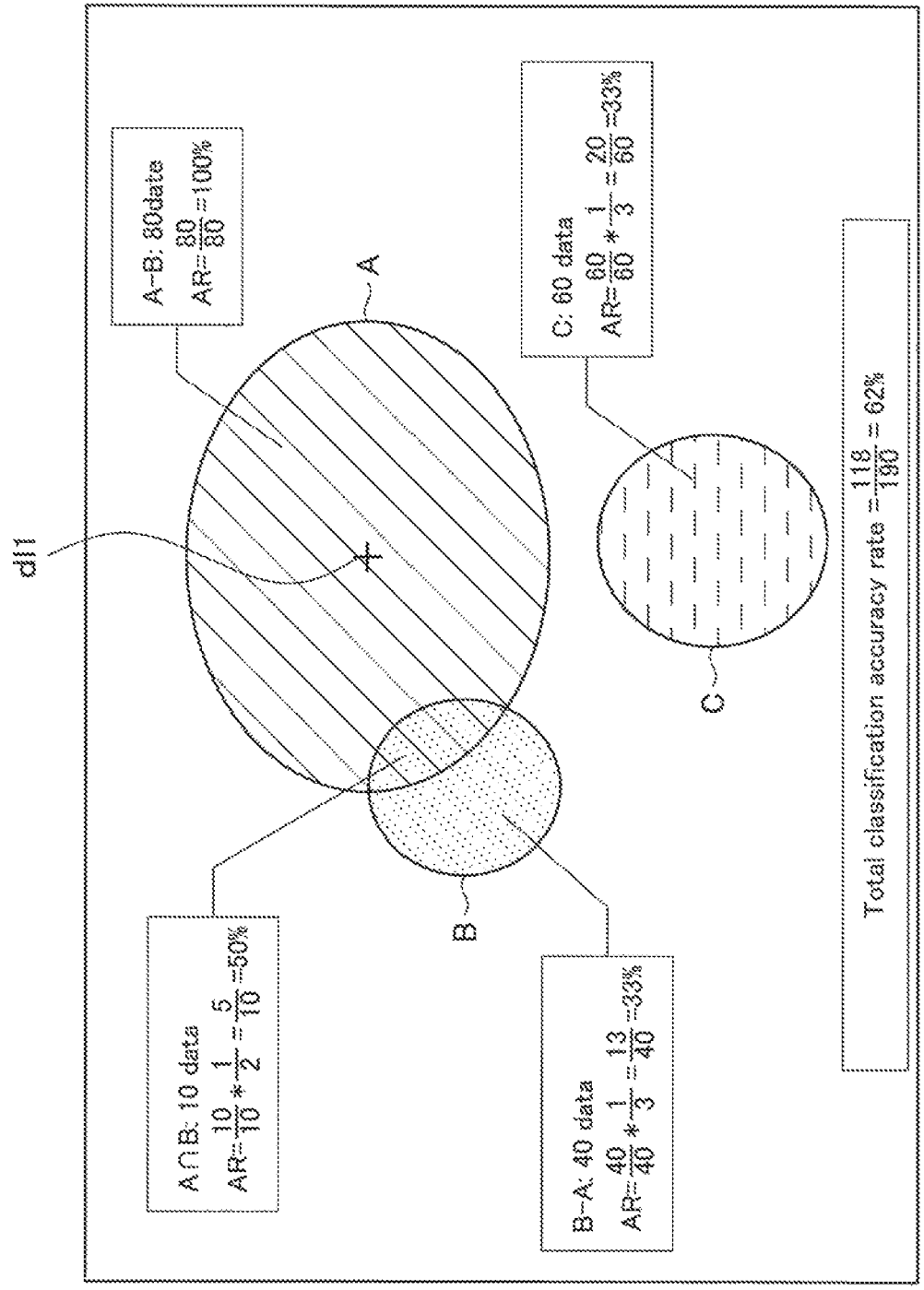
FIG. 12 is a diagram for describing prediction of learning performance performed by a learning performance prediction unit according to the embodiment.

The learning performance prediction unit 250 according to the present embodiment may predict the above-described learning performance on the basis that labeling of learning data has been executed by the labeling execution unit 240, for example. FIG. 12 is a diagram for describing prediction of learning performance performed by the learning performance prediction unit 250 according to the present embodiment.

FIG. 12 shows an example of the case where learning performance predicted by the learning performance prediction unit 250 is displayed together on the data distribution diagram generated by the data distribution presentation unit 220. Here, the example shown in FIG. 12 shows a result of prediction of learning performance in the case where labeling has been performed on learning data dl1 belonging to the cluster A, and in addition, the number of pieces of learning data included in each of the clusters A to C may be configured as shown in FIG. 8. In addition, in the example shown in FIG. 12, it is assumed that labeling has not been performed on learning data other than the learning data dl1 belonging to the cluster A.

On this occasion, in the case where labeled learning data belonging only to a single cluster exists, the learning performance prediction unit 250 according to the present embodiment may predict that unlabeled learning data belonging only to the cluster is classified into a class identical to the labeled learning data.

In the example shown in FIG. 12, the learning data dl1 belongs only to the cluster A. Therefore, the learning performance prediction unit 250 can predict that all pieces of unlabeled learning data belonging only to the cluster A, that is, unlabeled learning data belonging to a difference set A-B are classified into a class identical to the learning data dl1.

In addition, in the case where, in a certain cluster, labeled learning data belonging only to the cluster does not exist, the learning performance prediction unit 250 according to the present embodiment may predict that a probability at which unlabeled learning data belonging only to the cluster is classified into a correct class is in proportion to the reciprocal of the number of all clusters.

As described above, the example shown in FIG. 12 is a situation where labeling has been performed only on the learning data dl1, and all pieces of learning data belonging to the cluster B or C may be unlabeled learning data. On this occasion, the learning performance prediction unit 250 according to the present embodiment can predict that a probability at which forty pieces of learning data belonging only to the cluster B are classified into a correct class is the reciprocal of the number of all clusters, that is, $\frac{1}{3}$. That is, the learning performance prediction unit 250 predicts that learning data to be classified into a correct class among learning data belonging only to the cluster B, that is, forty pieces of learning data belonging to a difference set B-A are thirteen pieces of data.

In addition, similarly, the learning performance prediction unit 250 predicts that a probability at which sixty pieces of learning data belonging only to the cluster C are classified into a correct class is $\frac{1}{3}$. That is, the learning performance prediction unit 250 may predict that learning data to be classified into a correct class among learning data belonging only to the cluster C are twenty pieces of learning data.

In addition, the learning performance prediction unit 250 according to the present embodiment can predict that a probability at which unlabeled learning data belonging to a common portion of clusters is classified into a correct class is in proportion to the reciprocal of the number of clusters that form the common portion. In the example shown in FIG. 12, ten pieces of learning data belong to the common portion formed by the clusters A and B. In this case, the learning performance prediction unit 250 can predict that a probability at which the ten pieces of learning data belonging to the common portion of A and B are classified into a correct class is $\frac{1}{2}$. That is, the learning performance prediction unit 250 predicts that learning data to be classified into a correct class among the ten pieces of learning data belonging to the common portion of A and B are thirteen pieces of data.

As a result of the above computations, the learning performance prediction unit 250 can predict that learning data to be classified into correct classes among one hundred ninety pieces of learning data in total are one hundred twelve pieces of data, and the accuracy rate is approximately 62%.

Next, the case where labeling has been newly performed on learning data belonging only to the cluster B in the state shown in FIG. 12 will be described. In addition, on this occasion, the case where a label assigned to the learning data belonging only to the cluster B and a label related to the learning data dl1 belonging only to the cluster A are identical is assumed. In this case, it can be predicted that one hundred thirty pieces of learning data in total belonging to the difference set A-B, the difference set B-A, and the common portion of A and B are all classified into a class identical to the learning data dl1. On the other hand, since it is predicted through the above-described computations that, regarding the cluster C, $\frac{2}{3}$ of sixty pieces of data are classified incorrectly, the accuracy rate as a whole can be predicted as 150/190=79%.

On the other hand, in the case where the label assigned to the learning data belonging only to the cluster B is different from the label related to the learning data dl1 belonging only to the cluster A in the state shown in FIG. 12, it is predicted through the above-described computations that 50% of ten pieces of learning data belonging to the common portion of A and B are classified incorrectly. Note that, since it is predicted that, regarding learning data belonging to the cluster C, forty pieces of data are classified incorrectly similarly to other examples, the accuracy rate as a whole can be predicted as 145/190=76%. In addition, in the case where labeling has been newly performed on learning data belonging to the cluster C in the above-described state, it is predicted that the sixty pieces of learning data belonging to the cluster C are all classified into a correct class. As a result, learning data to be classified incorrectly will be 50% of the ten pieces of learning data belonging to the common portion of A and B, that is, only five pieces of data, and the learning performance prediction unit 250 predicts that the accuracy rate as a whole is 185/190=97%.

A method of predicting learning performance by the learning performance prediction unit 250 according to the present embodiment has been described above. As described above, the learning performance prediction unit 250 according to the present embodiment can predict learning performance on the basis of the data distribution diagram and the labeling status of learning data. Note that the above description has been given using the case where performance prediction by the learning performance prediction unit 250 is performed on the basis that labeling of learning data has been executed as an example. On the other hand, the learning performance prediction unit 250 according to the present embodiment is capable of predicting learning performance even in the case where labeling has not been performed.

In this case, the data distribution presentation unit 220 according to the present embodiment may sweep hyperparameters related to the setting of the number of clusters and execute clustering through use of respective values to generate a plurality of data distribution diagrams different in the number of clusters. Subsequently, the learning performance prediction unit 250 according to the present embodiment can predict the maximum learning performance at each number of clusters on the basis of the above-described plurality of data distribution diagrams. On this occasion, the learning performance prediction unit 250 may predict learning performance in the case where labeled learning data exists in all the clusters, and may determine the learning performance as the maximum learning performance. More precisely, the learning performance prediction unit 250 can predict learning performance in the case where, in all the clusters, labeled learning data belonging only to each of the clusters exists as the maximum learning performance.

In addition, the display control unit 260 according to the present embodiment may cause the above-described number of clusters and the above-described maximum learning performance to be displayed in association. On this occasion, the display control unit 260 according to the present embodiment can cause a comparison in the maximum learning performance among the respective numbers of clusters to be displayed.

Figure 13:
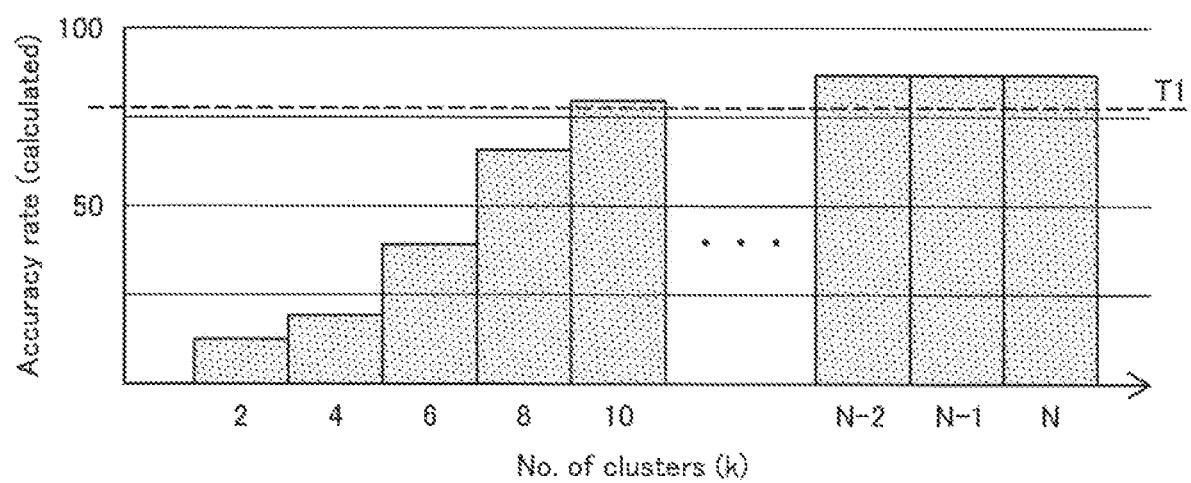
FIG. 13 is a diagram showing an exemplary comparison in the maximum learning performance among respective numbers of clusters according to the embodiment.

FIG. 13 is a diagram showing an exemplary comparison in the maximum learning performance among respective numbers of clusters. The display control unit 260 according to the present embodiment may cause the graph as shown in FIG. 13 to be displayed on the user interface IF1, for example. In the example shown in FIG. 13, the number of clusters is indicated on the horizontal axis, and predicted maximum learning performance is indicated on the vertical axis. In addition, in FIG. 13, a tolerance T1 of learning performance is indicated by the broken line. Here, the tolerance T1 indicates the minimum value of learning performance that may be tolerated, and may be a value previously set by a user or the like, for example.

By identifying the graph as shown in FIG. 13, the user can grasp the number of clusters which is necessary for satisfying the tolerance, that is, the number of pieces of learning data on which labeling is necessary. Specifically, the example shown in FIG. 13 shows that, in the case where the number of clusters exceeds ten, learning performance exceeds the tolerance. Here, as described above, the learning performance shown in FIG. 13 may be the maximum learning performance in the case where labeled learning data belonging only to each of the clusters exists. Therefore, in order to ensure learning performance exceeding the tolerance, the user can grasp that it is sufficient if labeling is performed on ten pieces of learning data belonging only to each of the clusters.

In addition, referring to FIG. 13, it is understood that the maximum learning performance hardly changes in the case where the number of clusters is more than or equal to N−2. That is, the graph as shown in FIG. 13 suggests that, in the case where the number of clusters is more than or equal to N−2, the burden of labeling increases, while an obtained performance improvement effect is low. In this manner, when the learning performance prediction unit 250 according to the present embodiment predicts the maximum learning performance for each number of clusters, the user can visually grasp the performance improvement effect to be obtained by labeling, and the need to perform unnecessary labeling can be eliminated. For example, the user may determine the number of clusters upon identifying the graph as shown in FIG. 13, and may perform labeling on learning data positioned close to the center of gravity of each of the clusters on the basis of the generated data distribution diagram. On this occasion, the user can control the above-described number of clusters by setting the value of k in k-means, for example. The user may give priority to reduction of the burden of labeling by setting k at a small value, or may give priority to an improvement of learning performance by setting k at a large value.

In addition, the determination of the number of clusters according to the present embodiment may be performed dynamically by the learning performance prediction unit 250. That is, the learning performance prediction unit 250 according to the present embodiment can determine the optimum number of clusters on the basis of the maximum learning performance at each number of clusters. On this occasion, the learning performance prediction unit 250 may determine the above-described optimum number of clusters on the basis of the above-described tolerance, a priority mode having been set, or the like. In addition, the data distribution presentation unit 220 according to the present embodiment may generate a data distribution diagram on the basis of the above-described optimum number of clusters. As described above, regarding the data distribution diagram, the number of clusters in the generated data distribution diagram can be controlled by setting the value of k on the basis of the optimum number of clusters.

<<1.12. Learning Based on Learning Data>>

Next, details of learning performed by the learning device 40 will be described. As described above, the learning unit 410 of the learning device 40 according to the present embodiment has a function of performing learning based on labeled learning data and unlabeled learning data. The learning unit 410 according to the present embodiment may perform semi-supervised learning, domain adaptation, weakly supervised learning, or the like based on the above-described learning data, for example. Note that the case where the learning unit 410 performs semi-supervised learning will be described below as an example.

The learning unit 410 according to the present embodiment has functions of taking learning performance predicted by the learning performance prediction unit 250 as correct, and in order to satisfy the learning performance, improving the learning performance while changing the design or technique for a neural network, for example. On this occasion, the learning unit 410 may perform semi-supervised learning by means of widely-used VAE, ADGM, SDGM, DCGAN, LadderNet, VAT, AAE, or the like, for example. The learning unit 410 may have functions of selecting a useful technique from the foregoing on the basis of characteristics of learning data or the like, and designing a neural network in accordance with the technique. Hereinafter, an overview of each of the methods listed above will be described.

(VAE)

VAE is a technique obtained by combining variational Bayes and autoencoder in order to learn deep generative models (DGM). In VAE, the variational lower bound of model evidence is used instead of the loss function, unlike the general autoencoder. In addition, one of characteristics of VAE lies in that a stochastic layer (Gaussian sampling layer) is included in an intermediate layer for calculation of the variational lower bound.

Conventionally, VAE is a technique for use in unsupervised learning, whilst semi-supervised learning can be performed in the present embodiment by using extended VAE. More specifically, the learning unit 410 according to the present embodiment performs semi-supervised learning by combining VAE with extended label input and a recognition model.

Figure 14:
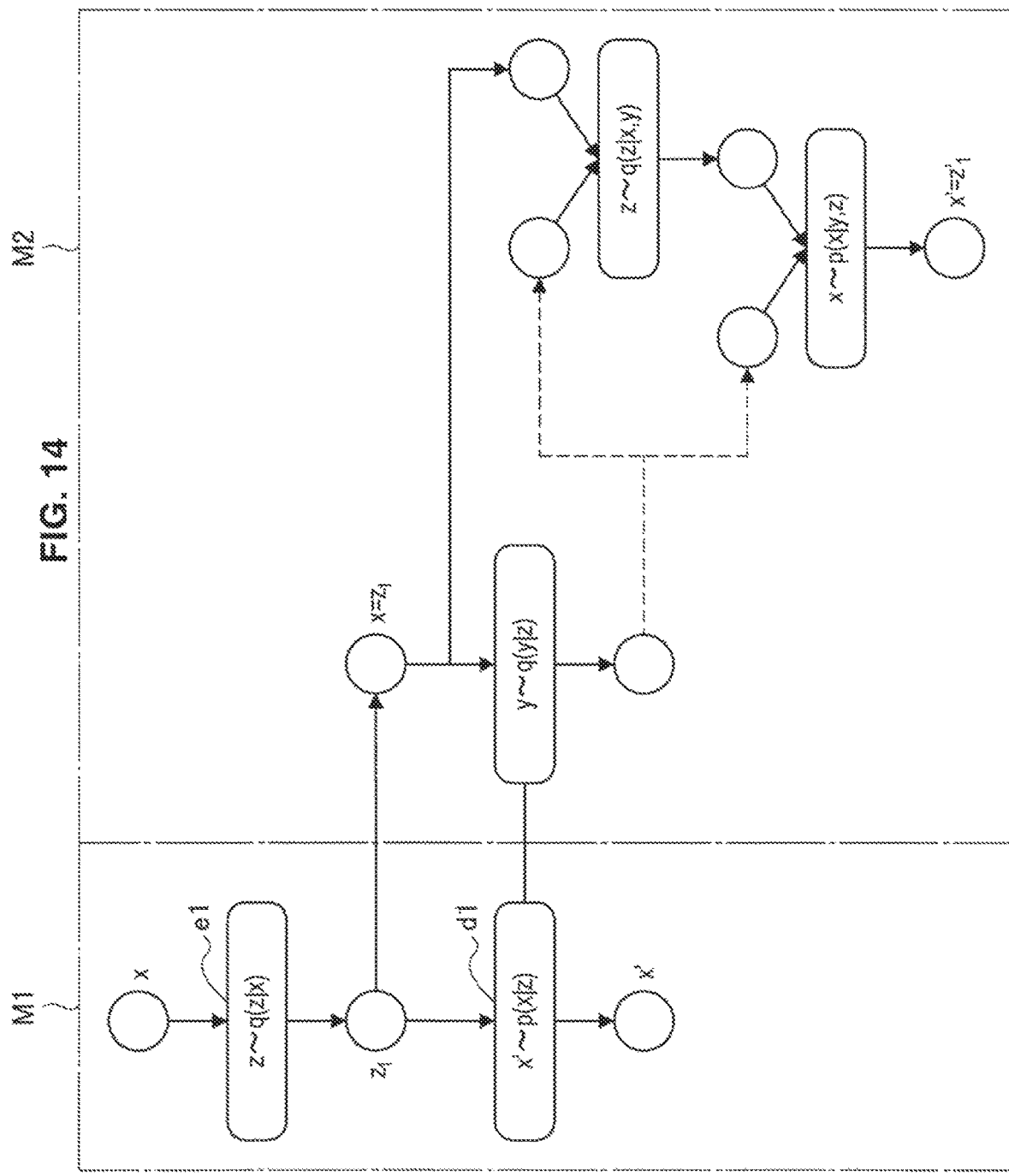
FIG. 14 is a diagram showing a network structure of a neural network that performs semi-supervised learning through use of VAE according to the embodiment.

FIG. 14 is a diagram showing a network structure of a neural network NN1 that performs semi-supervised learning through use of VAE. As shown in FIG. 14, the neural network NN1 includes a model M1 and a model M2.

Here, the model M1 is VAE that performs previous learning by means of unsupervised learning. More specifically, the model M1 can model an inference distribution by means of an encoder e1, and can model a generation distribution by means of a decoder d1. On this occasion, an objective function of the model M1 is expressed by the variational lower bound of model evidence. Note that marginalization processing by means of an internal variable $z_1$ included in the above-described objective function is approximated by sampling integration.

In addition, the model M2 is a model that performs actual semi-supervised learning. Specifically, the model M2 can perform semi-supervised learning using a feature quantity generated by the model M1 as learning data. That is, feature extraction performed by the model M1 can be regarded as processing of learning data to be used for the model M2.

(ADGM and SDGM)

ADGM is an abbreviation of auxiliary deep generative models. In addition, SDGM is an abbreviation of skip deep generative models, and is expressed by a graphic model similar to ADGM. Here, the above-described auxiliary expresses a stochastic auxiliary variable, and the stochastic auxiliary variable is used for improving expressiveness of distributions in inference distribution estimation of the variational Bayes or the like.

ADGM and SDGM are models that achieve semi-supervised learning by means of batch learning (EndToEnd). Note that, although the model M2 through use of VAE described above can perform semi-supervised learning alone, two-stage learning by means of the models M1 and M2 is desirable for performance improvement. On the other hand, ADGM increases the expressive ability of the model M2 using the auxiliary variable, and can achieve batch learning.
(DCGAN)

Deep convolutional generative adversarial network (DC-GAN) is a model obtained by refining the generative adversarial network (GAN). Here, GAN is a technique of causing learning to be performed with a generative model and a discriminant model (true/false discriminant model) being opposed. Note that the true/false discriminant model refers to a discriminator that discriminates whether input data is true data or false data generated by the generative model. In GAN, the generative model operates in a manner to increase wrong discrimination by the true/false discriminant model, and the true/false discriminant model operates in a manner to improve the ratio of seeing through false data generated by the generative model as being false. As a result, the generative model gains the ability to generate data closer to true data.

In DCGAN, it is also possible to use the above-described true/false discriminant model as a feature extraction model. In addition, semi-supervised learning can also be achieved by combining this feature extraction model and the discriminant model. Specifically, outputs of the respective layers of the true/false discriminant model are connected to perform learning such as support vector machine (SVM).
(LadderNet)

LadderNet is a technique obtained by combining a de-noising autoencoder having ladder coupling and a recognition model. In LadderNet, the encoder and the recognition model share a weight, and in addition, the encoder and decoder are formed at an identical depth and have a coupling between levels at the same depth. Note that the coupling from the encoder to the decoder is configured by a computation having the function of de-noising.
(AAE)

Adversarial autoencoder (AAE) is a technique for using the true/false discriminant model in GAN described above for true/false determination of a prior distribution and an inference distribution for the intermediate layer of VAE. That is, AAE achieves semi-supervised learning by separating the intermediate layer into label and style.

The configuration of the neural network that the learning unit 410 according to the present embodiment may adopt has been described above using examples. The above-described neural network is a configuration that combines a plurality of modules such as a recognition model, a generative model, an inference model, and a true/false discriminant model, and performs learning at the same time. Note that a network corresponding to each module may be configured by a combination of simpler modules such as CNN, batch normalization, RNN, ResidualNet, and the like. The learning unit 410 can design a neural network using the modules as described above, and can perform learning so as to approach learning performance predicted by the learning performance prediction unit 250. Note that, since it is expected that insufficient labeling is a cause of the case where actual learning performance and a predicted value depart significantly, the learning unit 410 may be caused to perform learning again upon increasing labeled learning data.

<<1.13. Effects of Semi-Supervised Learning According to Present Embodiment>>

Next, effects of semi-supervised learning according to the present embodiment will be described using specific examples. A discrimination result obtained when causing the learning device 40 to perform the swing type discrimination task in the racket sports A and B will be described below.

First, a result of the swing type discrimination task in the racket sports A will be described. Here, accelerations and angular velocities in three-axis directions were sampled by the data collection device 10 mounted on a racket at predetermined frequencies, respectively, and time-series extracted waveforms were determined as a data set. In addition, at the time of learning, labeled learning data related to swinging operations of nine classes was generated for the learning device 40 to perform semi-supervised learning, and at the time of a test, the type of swinging operations was caused to be estimated from waveform data not existing in learning data.

Figure 15:
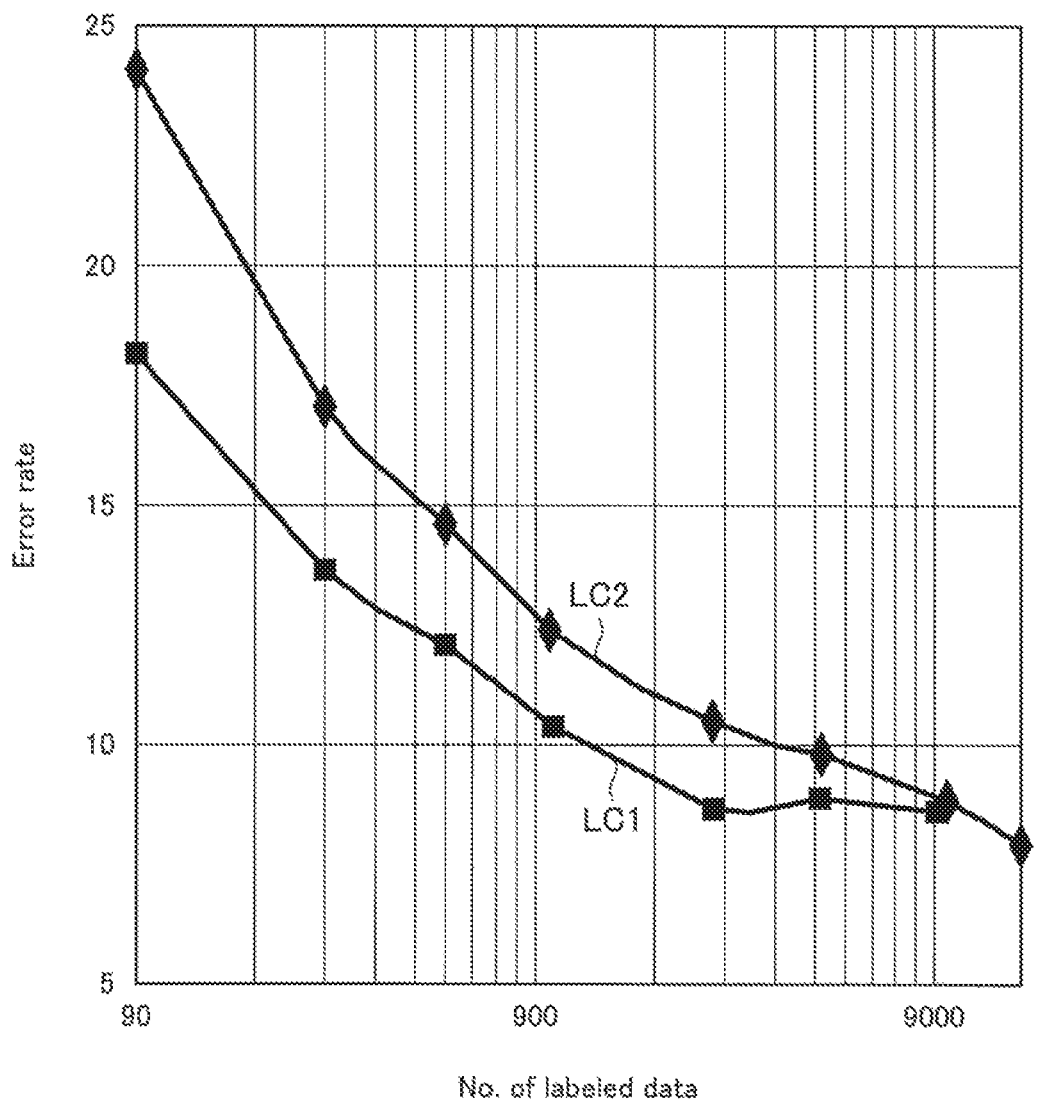
FIG. 15 is a diagram showing a swing type determination result in a racket sports A according to the embodiment.

FIG. 15 is a diagram showing a swing type determination result in the racket sports A. Here, in FIG. 15, the error discrimination rate is indicated on the vertical axis, and the number of pieces of labeled learning data is indicated on the horizontal axis. In addition, in FIG. 15, a discrimination result LC1 when semi-supervised learning was caused to be performed and a discrimination result LC2 when supervised learning was caused to be performed are shown. Referring to FIG. 15, in the case where ninety pieces of labeled data were used, it is understood that the error discrimination rate in the case where semi-supervised learning was performed significantly falls below the error discrimination rate in the case where supervised learning was performed. Note that, on this occasion, 14490 pieces of unlabeled data was used together with ninety pieces of labeled data in semi-supervised learning.

Figure 16:
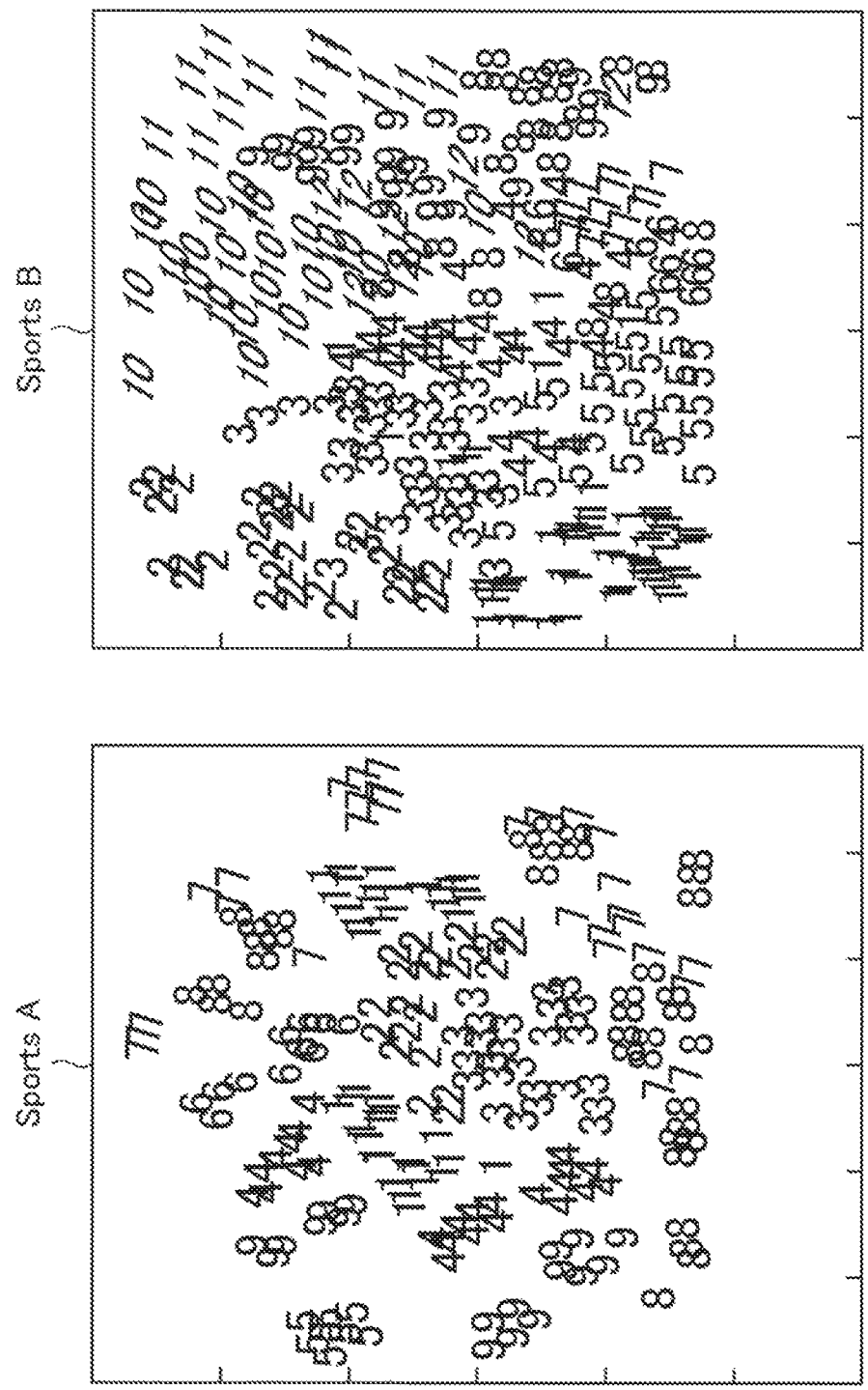
FIG. 16 shows results of clustering learning data used in a discrimination task for the racket sports A and B according to the embodiment.

In addition, on the left side of FIG. 16, a result of clustering learning data used in the discrimination task for the racket sports A is shown. Note that, in the clustering result shown in FIG. 16, learning data corresponding to each class is schematically expressed using numbers. Referring to FIG. 16, in the clustering result related to the racket sports A, it is understood that the boundaries of the respective clusters are clear although clusters corresponding to some classes exist separately.

A result of the swing type discrimination task in the racket sports B will be described. In the discrimination task related to the racket sports B, sensor information collected by the data collection device 10 was processed and used for learning data, similarly to the case of the racket sports A. However, in the discrimination task related to the racket sports B, labeled learning data related to swinging operations of 18 classes were generated, and learning was caused to be performed.

Figure 17:
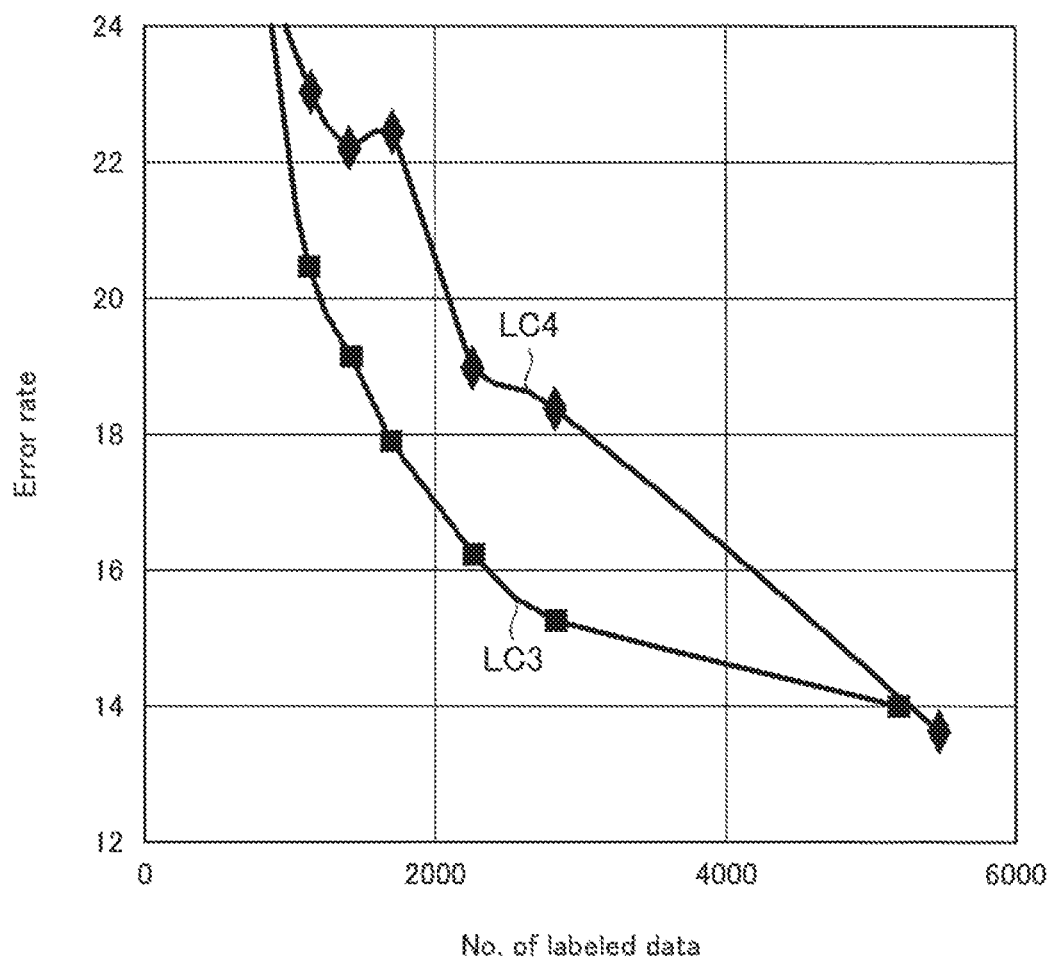
FIG. 17 is a diagram showing a swing type determination result in the racket sports B according to the embodiment.

FIG. 17 is a diagram showing a swing type determination result in the racket sports B. In FIG. 17, the error discrimination rate is indicated on the vertical axis, and the number of pieces of labeled learning data is indicated on the horizontal axis, similarly to FIG. 15. In addition, in FIG. 17, a discrimination result LC3 when semi-supervised learning was caused to be performed and a discrimination result LC4 when supervised learning was caused to be performed are shown. As shown in FIG. 17, in the discrimination task related to the racket sports B, it is also understood that the error discrimination rate in the case where semi-supervised learning was performed falls below the error discrimination rate in the case where supervised learning was performed.

In addition, on the right side of FIG. 16, a result of clustering learning data used in the discrimination task for the racket sports B is shown. Referring to FIG. 16, in the clustering result related to the racket sports B, it is understood that each cluster can be grasped roughly although overlaps of clusters are more remarkable than in the clustering result of the racket sports A.

Effects of semi-supervised learning according to the present embodiment have been described above. Note that the swing type discrimination tasks in the racket sports A and B have been described above, whilst semi-supervised learning according to the present embodiment may be used for a discrimination task for handwritten numbers or a discrimination task for action recognition, for example. As described above, with semi-supervised learning according to the present embodiment, achievement of discrimination with higher accuracy than in supervised learning is expected.

In addition, the learning unit 410 according to the present embodiment may perform learning using two or more different data sets having similarity. For example, the learning unit 410 according to the present embodiment can also integrate data sets related to the racket sports A and B to perform semi-supervised learning.

The racket sports A and B described above are sports of types different from each other, but are common in that time-series data obtained by measuring accelerations and distortions applied to a racket by the data collection device 10 mounted on the racket is used for learning. In such a case, the learning unit 410 according to the present embodiment can handle data sets collected in both the sports as being an identical form by equalizing the sensitivity of collected data sets and the length of series. On the other hand, in this case, the types related to swinging operations, that is, labels are different between the racket sports A and B. In this manner, different data sets having similarity according to the present embodiment refer to data sets having different labeling rules from each other in data sets having a common background, such as joint movements, as in the examples of racket sports in the above-described examples, for example.

Figure 18:
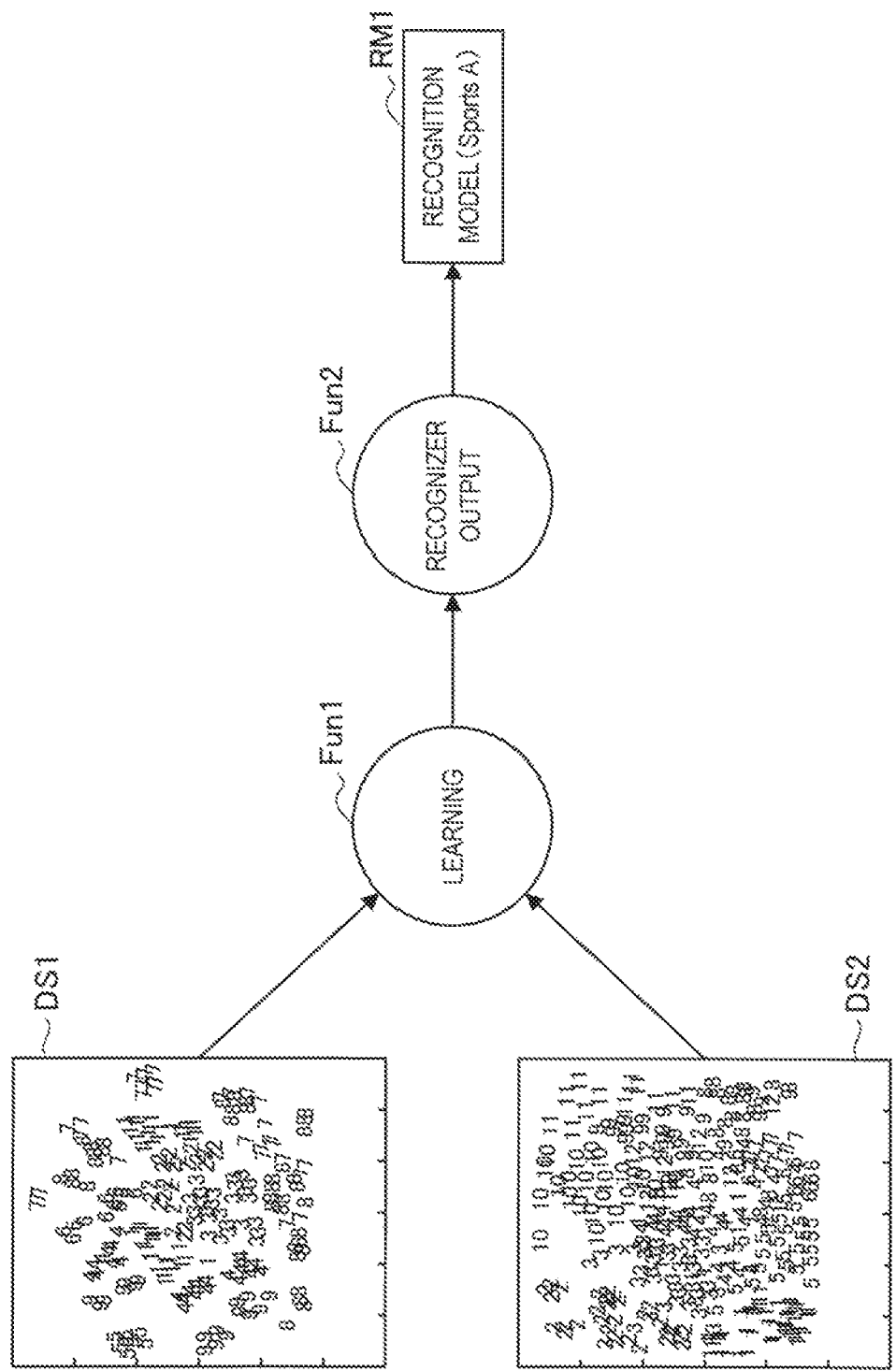
FIG. 18 is a data flow diagram for describing learning through use of two or more different data sets having similarity according to the embodiment.

FIG. 18 is a data flow diagram for describing learning through use of two or more different data sets having similarity according to the present embodiment. In FIG. 18, two different data sets DS1 and DS2 having similarity are shown. Here, the data sets DS1 and DS2 may be data related to the racket sports A and B, as described above. In this case, for example, the learning unit 410 according to the present embodiment can perform learning of the swing type discrimination related to the racket sports A on the basis of the data sets DS1 and DS2 by means of a learning function Fun1. On this occasion, for example, the learning unit 410 may use data about the racket sports B for semi-supervised learning as unlabeled data without using a label assigned to the racket sports B. In addition, the recognizer output unit 420 outputs a recognizer RM1 related to swinging operations in the racket sports A obtained as a learning result by means of a recognizer output function Fun2.

Learning based on different data sets having similarity according to the present embodiment has been described above. Note that data sets having different labeling rules and originally being of the same type, for example, may be included in the different data sets having similarity according to the present embodiment. For example, in the case where, in learning in which identification has been performed by three classes at first, the number of classes is increased to nine through refinement, data sets for use in learning by means of each class number can be said as being different data sets having similarity.

In addition, also in the case where, although being similar recognition targets, labeling for one of the data sets is difficult, the respective data sets can be handled as different data sets having similarity in the present embodiment. For example, in the case where it is difficult to collect data for reasons such as privacy protection in the case where an emotion label is desired to be acquired from human vital information, it is possible to add data using animal vital information to perform learning. In this case, since an emotion label is difficult to acquire even though animal vital data can be acquired, a technique for learning with unlabeled data and labeled data being mixed, such as semi-supervised learning, is necessary. In addition, besides such an example, labeled data may be collected in a simulated manner through calculator simulation for a task in which labels cannot be collected or are difficult to collect.

Note that, in the description through use of FIG. 18, the case of using one of the data sets as unlabeled data without using the label has been described as an example, whilst the learning unit 410 according to the present embodiment may perform semi-supervised learning using labels of both the data sets, for example. In addition, it is also possible to study data distributions without using labels of both the data sets to compare both the data sets in similarity between the distributions and the like.

<<1.14. Flow of Operation of Information Processing Server 20>>

Figure 19:
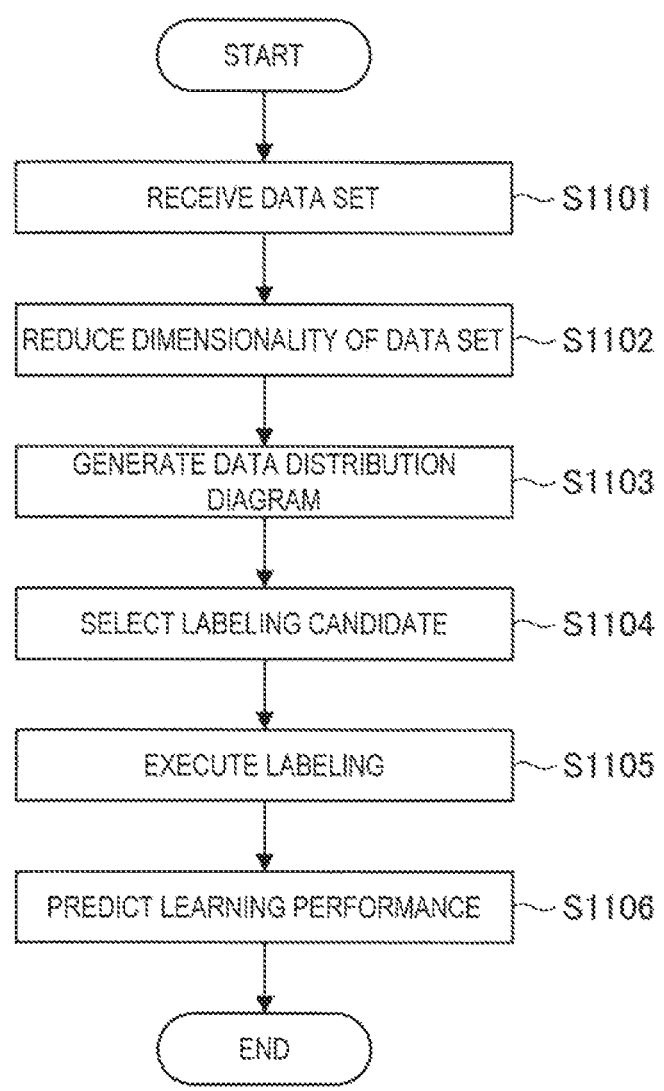
FIG. 19 is a flowchart showing a flow of operation of the information processing server 20 according to the embodiment.

Next, a flow of operation of the information processing server 20 according to the present embodiment will be described in detail. FIG. 19 is a flowchart showing a flow of operation of the information processing server 20.

Referring to FIG. 19, first, the communication unit 270 of the information processing server 20 receives a data set from the data collection device 10 (S1101).

Next, the learning data input unit 210 carries out processing for the purpose of dimensionality reduction on the data set received in step S1101, and inputs the data after processing to the data distribution presentation unit 220 as learning data (S1102). On this occasion, the learning data input unit 210 can perform the above-described processing using a technique such as PCA, AutoEncoder, or VAE, as described above.

Next, the data distribution presentation unit 220 generates a data distribution diagram on the basis of the learning data having been subjected to dimensionality reduction in step S1102 (S1103). On this occasion, the data distribution presentation unit 220 according to the present embodiment may perform dimensionality reduction using a technique such as MDS or tSNE. In addition, the display control unit 260 causes the data distribution diagram generated in step S1103 to be displayed on the interface IF1.

Next, the labeling candidate selection unit 230 selects labeling candidates from learning data on the basis of the data distribution diagram generated in step S1103 (S1104). On this occasion, the labeling candidate selection unit 230 according to the present embodiment may select learning data positioned close to the center of gravity of a cluster in the data distribution diagram as labeling candidates. In addition, the display control unit 260 causes the labeling candidates selected in step S1104 to be displayed on the user interface IF1.

Next, on the basis of the learning data selected in the data distribution diagram displayed on the user interface IF1 and an input value, the labeling execution unit 240 performs labeling on the learning data (S1105).

Next, the learning performance prediction unit 250 predicts learning performance of the learning device 40 on the basis of the data distribution diagram generated by the data distribution presentation unit 220 and the labeling status related to learning data (S1106).

A flow of operation of the information processing server 20 according to the present embodiment has been described above. Note that the foregoing describes the case where the learning performance prediction unit 250 predicts learning performance on the basis that labeling on learning data has been performed as an example, whilst the learning performance prediction unit 250 according to the present embodiment can predict learning performance even in the case where labeling has not been performed, as described above.

2. Second Embodiment

<<2.1. Overview of Second Embodiment>>

Next, an overview of a second embodiment of the present disclosure will be described. Here, the second embodiment of the present disclosure will be described first. In the above description of the first embodiment, the case where the information processing server 20 performs various types of processing on the basis of data sets collected and accumulated by the data collection device 10 has been described. On the other hand, one of characteristics of the information processing server 20 according to the second embodiment of the present disclosure lies in that processing is performed on the basis of sequentially collected data. More specifically, the learning performance prediction unit 250 according to the present embodiment has a function of, on the basis of a generated data distribution diagram and newly input learning data, making a determination about whether or not labeling related to the learning data is necessary. In addition, the display control unit 260 according to the present embodiment has a function of causing a user interface that prompts for labeling of newly input learning data to be displayed on the basis of the determination about whether or not labeling is necessary made by the learning performance prediction unit 250. The above-described functions that the information processing server 20 according to the present embodiment has will be described below in detail.

<<2.2. Exemplary Functional Configuration of Information Processing Server 20>>

First, an exemplary functional configuration of the information processing server 20 according to the present embodiment will be described. Here, differences from the information processing server 20 according to the first embodiment will be described mainly, and overlapping functions will be omitted from the description.

(Learning Data Input Unit 210)

The learning data input unit 210 according to the present embodiment inputs data sequentially collected by the data collection device 10 to the data distribution presentation unit 220 as learning data. Note that the data collection device 10 according to the present embodiment may be a smartphone, a tablet, a PC, a mobile phone, or the like that the user has, for example.

(Data Distribution Presentation Unit 220)

The data distribution presentation unit 220 according to the present embodiment generates a data distribution diagram on the basis of learning data sequentially input by the learning data input unit 210.

(Learning Performance Prediction Unit 250)

The learning performance prediction unit 250 according to the present embodiment makes a determination about whether or not labeling related to the learning data is necessary on the basis of the data distribution diagram generated by the data distribution presentation unit 220 and newly input learning data. The above-described functions that the learning performance prediction unit 250 according to the present embodiment has will be described separately in detail.

(Display Control Unit 260)

The display control unit 260 according to the present embodiment causes a user interface that prompts for labeling of newly input learning data to be displayed on the basis of the determination about whether or not labeling is necessary made by the learning performance prediction unit 250.

Figure 20:
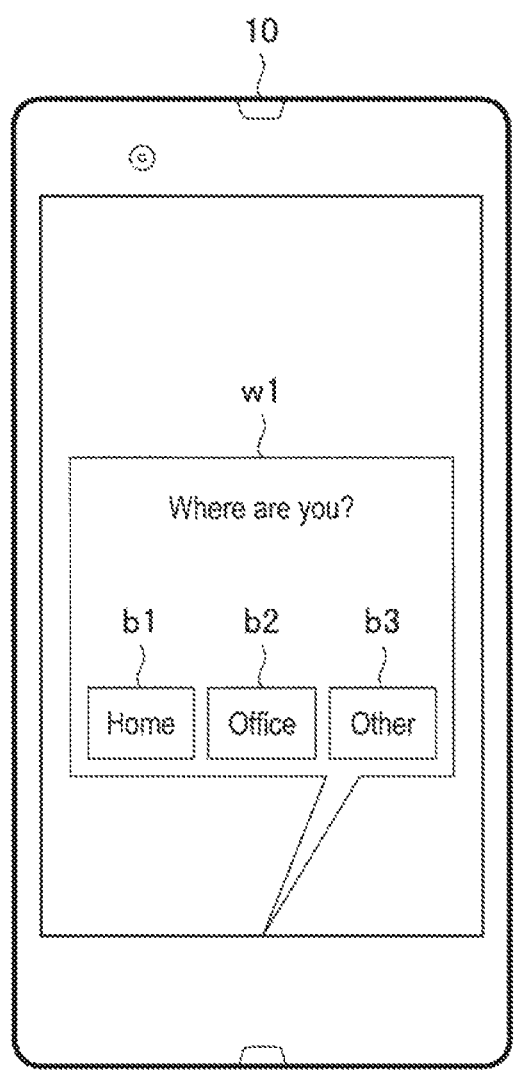
FIG. 20 is an example of a user interface displayed on an output unit of a data collection device by a display control unit according to a second embodiment of the present disclosure.

FIG. 20 is an example of a user interface displayed on the output unit 140 of the data collection device 10 by the display control unit 260. As described above, the data collection device 10 according to the present embodiment may be an information processing terminal of various types held by the user. Note that FIG. 20 shows a display example of the case where collected data is positional information. As shown in FIG. 20, the display control unit 260 according to the present embodiment can cause a window W1 that prompts for labeling on newly input learning data to be displayed. In addition, on this occasion, the display control unit 260 may cause buttons b1 to b3 for assisting in labeling performed by the user to be displayed, as shown in FIG. 20.

Note that the example of FIG. 20 shows the case where the display control unit 260 causes a message for having the user select a position to be displayed, whilst the display control unit 260 can also cause a message such as "Is it home here?", for example. In addition, although not shown in FIG. 20, the display control unit 260 may arrange a cancel button and the like on the user interface.

(Labeling Execution Unit 240)

The labeling execution unit 240 according to the present embodiment has a function of performing labeling of learning data on the basis of information input by the user on the user interface whose display is controlled by the display control unit 260. That is, in the case where the user has performed input of a label, the labeling execution unit 240 according to the present embodiment adds the relevant learning data to a labeled data set, and in the case where input of labeling is not performed, adds the above-described learning data to an unlabeled data set.

<<2.3. Determination about Whether or not Labeling is Necessary>>

Here, the determination about whether or not labeling is necessary according to the present embodiment will be described. As described above, the learning performance prediction unit 250 according to the present embodiment has the function of making a determination about whether or not labeling related to the learning data is necessary on the basis of the data distribution diagram and newly input learning data.

Figure 21:
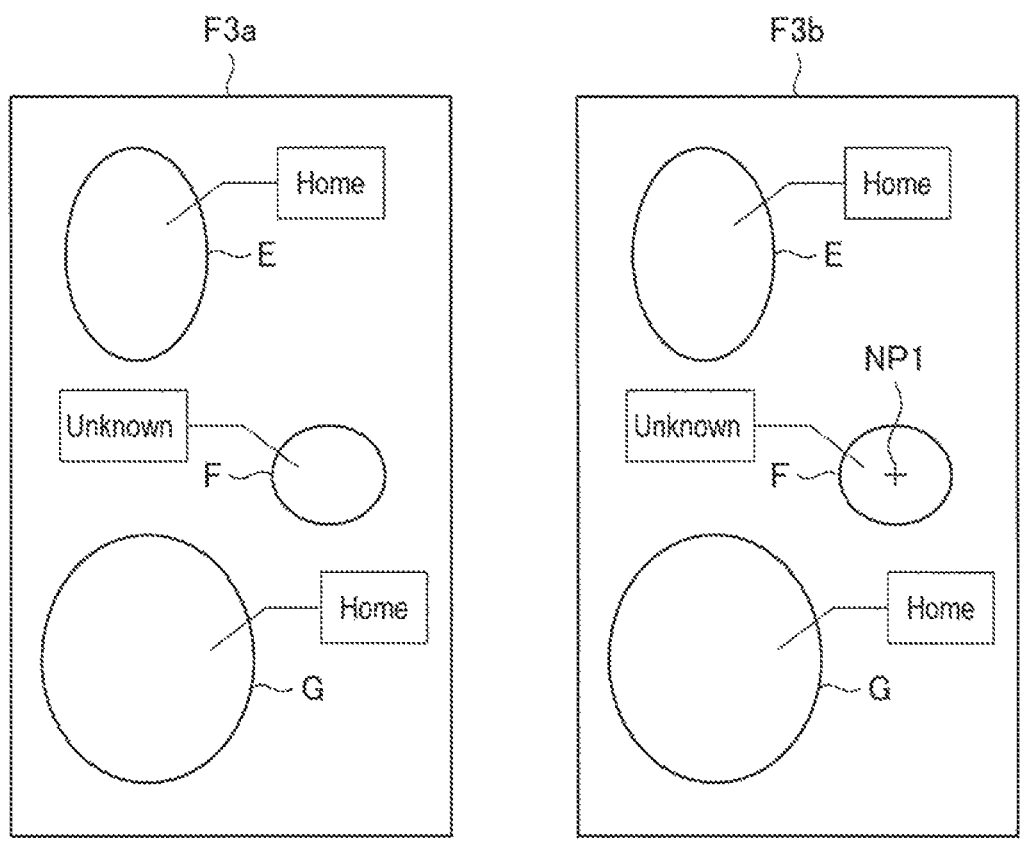
FIG. 21 shows diagrams for describing a determination about whether or not labeling is necessary according to the embodiment.

FIG. 21 shows diagrams for describing the determination about whether or not labeling is necessary according to the present embodiment. In FIG. 21, a data distribution diagram F3a on a day preceding the determination and a data distribution diagram F3b at the time of determination are shown. Here, it is assumed that an unknown cluster F has been generated in the data distribution diagram F3a on the preceding day. On this occasion, in the case where newly input learning data NP1 corresponds to the above-described cluster F in the data distribution diagram F3b at the time of determination, the learning performance prediction unit 250 determines that labeling for the learning data NP1 is necessary. That is, the information processing server 20 according to the present embodiment determines whether or not the newly input learning data contributes to improvement in learning performance, and in the case where it is determined that the learning data contributes to performance improvement, can prompt the user for labeling on the learning data. With the above-described functions that the information processing server 20 according to the present embodiment has, it is possible to request labeling at an appropriate timing while reducing the burden on the user.

Figure 22:
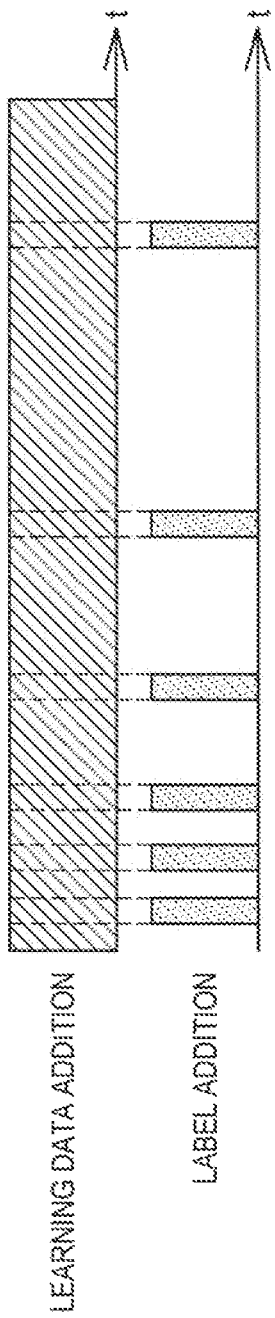
FIG. 22 is a diagram showing timings related to data collection and label addition according to the embodiment.

Note that FIG. 22 is a diagram showing timings related to data collection and label addition according to the present embodiment. As shown in FIG. 22, in the present embodiment, it is expected that the label addition frequency gradually decreases while data is sequentially collected. Therefore, even in the case where there is a label addition burden by the user in an initial stage, it is expected that the burden gradually decreases.

The determination about whether or not labeling is necessary according to the present embodiment has been described above. Note that, in the case where input of a label is not performed by the user, the learning device 40 may not necessarily use the unlabeled learning data for learning. On this occasion, the learning device 40 may delete learned unlabeled data in order to reduce a load on a storage or the like, or may perform processing of returning a parameter in the present model to an initial value. In addition, the learning device 40 can also perform learning only with unlabeled data not yet used.

In addition, on the other hand, the learning device 40 may store learned unlabeled data to the extent possible in order to maintain the accuracy of learning, or may initialize the above-described parameter each time. In addition, the learning device 40 can also perform learning using unlabeled data selected at random. The learning device 40 according to the present embodiment is capable of performing learning using a combination of examples listed above or learning data selected under another standard.

<<2.4. Flow of Operation of Information Processing Server 20>>

Figure 23:
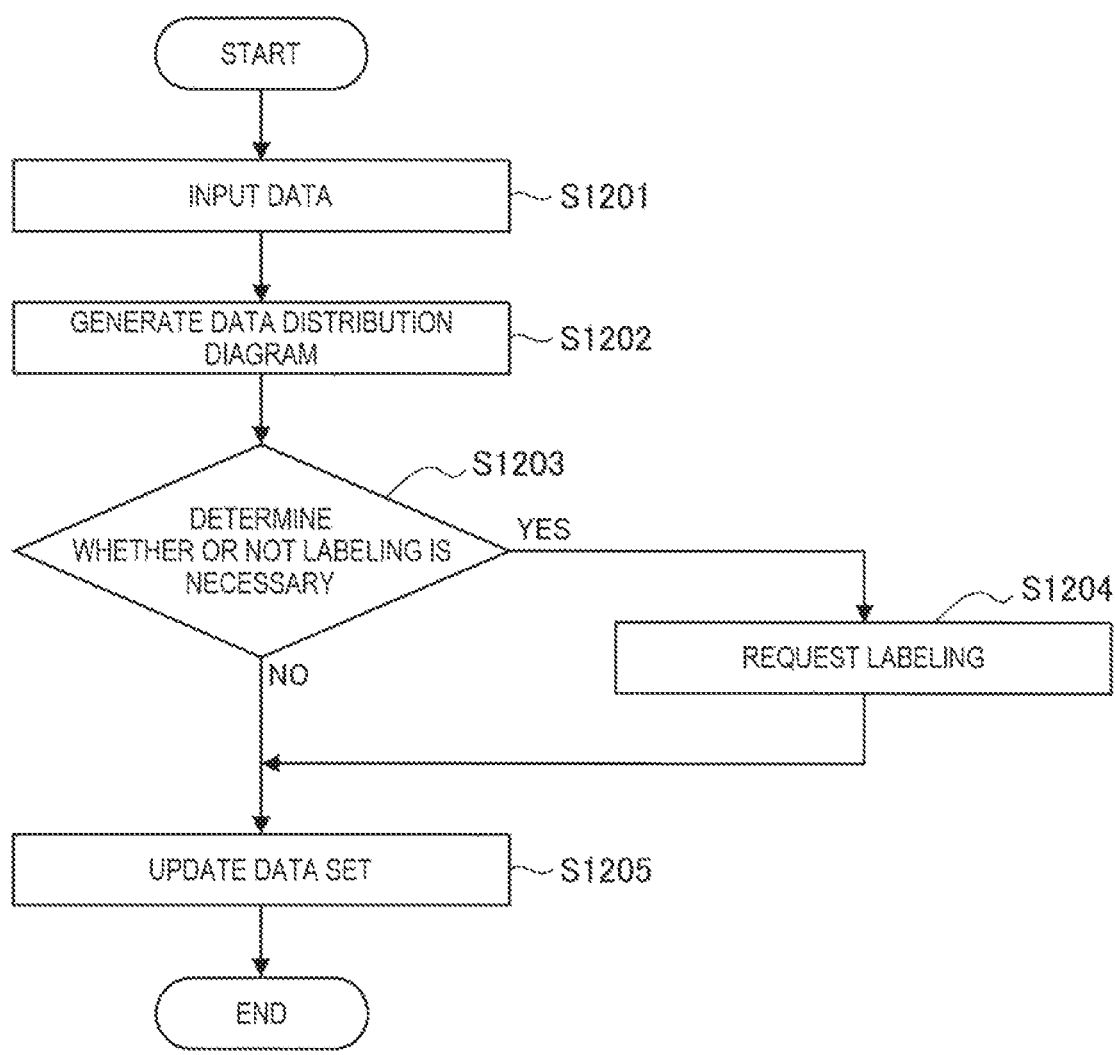
FIG. 23 is a flowchart showing a flow of operation of the information processing server 20 according to the embodiment.

Next, a flow of operation of the information processing server 20 according to the present embodiment will be described in detail. FIG. 23 is a flowchart showing a flow of operation of the information processing server 20 according to the present embodiment.

Referring to FIG. 23, the learning data input unit 210 of the information processing server 20 first inputs sequentially collected data to the data distribution presentation unit 220 (S1201).

Next, the data distribution presentation unit 220 generates a data distribution diagram on the basis of the data input in step S1201 (S1202).

Next, the learning performance prediction unit 250 makes a determination about whether or not labeling related to the learning data is necessary on the basis of the data distribution diagram and newly input learning data (S1203).

Here, in the case where it is determined by the learning performance prediction unit 250 that labeling is necessary, the display control unit 260 causes a user interface that requests the user to perform labeling to be displayed on the data collection device 10 (S1204).

Next, the labeling execution unit 240 updates the data set on the basis of information about label input made by the user (S1205), and the information processing server 20 terminates a series of processing.

3. Exemplary Hardware Configuration

Figure 24:
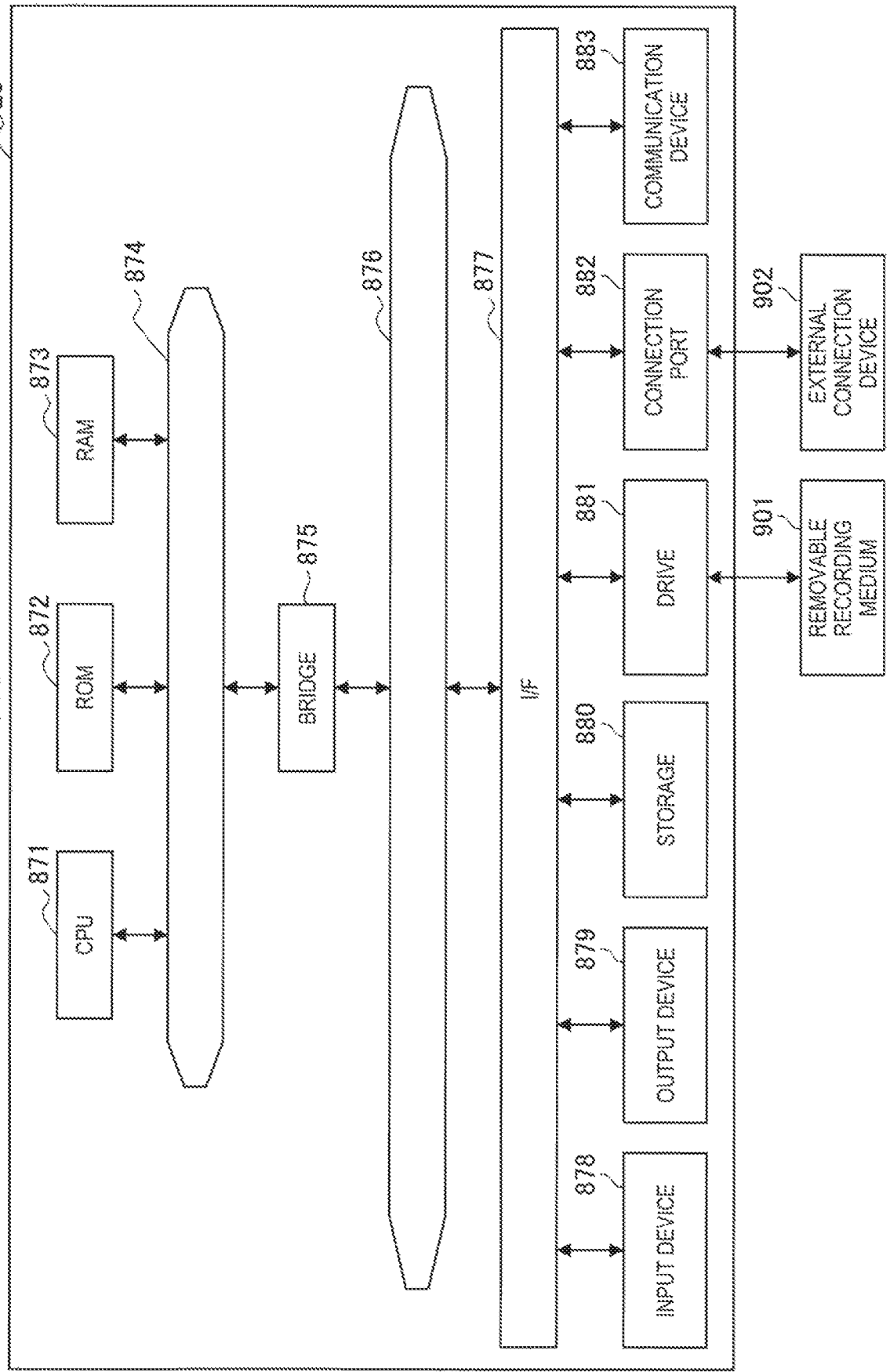
FIG. 24 is an exemplary hardware configuration according to the present disclosure.

Next, an exemplary hardware configuration common to the data collection device 10, the information processing server 20, the information processing terminal 30, and the learning device 40 according to the present disclosure will be described. FIG. 24 is a block diagram showing an exemplary hardware configuration of the data collection device 10, the information processing server 20, the information processing terminal 30, and the learning device 40 according to the present disclosure. Referring to FIG. 14, each of the devices according to the present disclosure described above includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs read into the CPU 871, data used for operation, or the like. The RAM 873 temporarily or permanently stores, in one example, a program to be read into the CPU 871, various parameters appropriately changing in executing the program, or the like.

(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission speed, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes a speech input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901 such as a magnetic disk, an optical disk, a magneto-optical disk, or a semiconductor memory or writes information to the removable recording medium 901.

(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

4. Conclusion

As described above, the information processing server 20 according to the present disclosure can generate a data distribution diagram on the basis of input learning data, and visualize and present a data distribution status to the user. In addition, the information processing server 20 according to the present disclosure can predict learning performance on the basis of the generated data distribution diagram, and can present a result of the prediction to the user. In addition, the information processing server 20 can select learning data that contributes to an improvement of learning performance, and can present the learning data to the user. With such a configuration, it is possible to previously predict learning performance in accordance with the labeling status of learning data.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

It may not be necessary to chronologically execute respective steps in the process, which is executed by the information processing server 20 described in this specification, in the order described in the flow charts. For example, the respective steps in the process which is executed by the information processing server 20 may be processed in the order different from the order described in the flow charts, and may also be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a data distribution presentation unit configured to perform dimensionality reduction on input learning data to generate a data distribution diagram related to the learning data;

a learning performance prediction unit configured to predict learning performance on the basis of the data distribution diagram and a labeling status related to the learning data; and a display control unit configured to control a display related to the data distribution diagram and the learning performance, in which the data distribution diagram includes overlap information about clusters including the learning data and information about the number of pieces of the learning data belonging to each of the clusters.

(2)

The information processing device according to (1), in which in a case where labeled learning data belonging only to a single cluster exists, the learning performance prediction unit predicts that unlabeled learning data belonging only to the cluster is classified into a class identical to the labeled data.

(3)

The information processing device according to (1) or (2), in which in a case where, in a certain cluster, labeled learning data belonging only to the cluster does not exist, the learning performance prediction unit predicts that a probability at which unlabeled learning data belonging only to the cluster is classified into a correct class is in proportion to a reciprocal of the number of all clusters.

(4)

The information processing device according to any one of (1) to (3), in which the learning performance prediction unit predicts that a probability at which unlabeled learning data belonging to a common portion of the clusters is classified into a correct class is in proportion to a reciprocal of the number of clusters that form the common portion.

(5)

The information processing device according to any one of (1) to (4), in which the learning performance prediction unit predicts learning performance in a case where labeled learning data belonging only to each of the clusters exists in all of the clusters as maximum learning performance, and the display control unit causes the number of clusters and the maximum learning performance to be displayed in association.

(6)

The information processing device according to (5), in which the data distribution presentation unit generates a plurality of the data distribution diagrams different in the number of clusters, the learning performance prediction unit predicts the maximum learning performance at each number of clusters on the basis of the plurality of data distribution diagrams, and the display control unit causes a comparison in the maximum learning performance among respective numbers of clusters to be displayed.

(7)

The information processing device according to (6), in which the learning performance prediction unit determines an optimum number of clusters on the basis of the number of clusters and the maximum learning performance at the number of clusters, and the data distribution presentation unit generates the data distribution diagram on the basis of the optimum number of clusters.

(8)
The information processing device according to any one of (1) to (7), further including:
a labeling candidate selection unit configured to select a labeling candidate from the learning data on the basis of the data distribution diagram, in which
the labeling candidate selection unit selects learning data positioned close to a center of gravity of the cluster as the labeling candidate, and
the display control unit causes the labeling candidate to be displayed.

(9)
The information processing device according to any one of (1) to (8), further including:
a labeling execution unit configured to, on the basis of learning data selected in the data distribution diagram and an input value, perform labeling of the learning data.

(10)
The information processing device according to (9), in which
on the basis of the selected learning data, the display control unit causes reference information corresponding to the learning data to be displayed.

(11)
The information processing device according to (10), in which
the display control unit causes the reference information and accompanying data synchronized with the reference information to be displayed in association.

(12)
The information processing device according to any one of (1) to (11), in which
on the basis of the data distribution diagram and newly input learning data, the learning performance prediction unit makes a determination about whether or not labeling related to the learning data is necessary.

(13)
The information processing device according to (12), in which
on the basis of the determination about whether or not labeling is necessary made by the learning performance prediction unit, the display control unit causes a user interface that prompts for labeling of the newly input learning data to be displayed.

(14)
The information processing device according to any one of (1) to (13), further including:
a learning unit configured to perform learning based on the learning data.

(15)
The information processing device according to (14), in which
the learning unit performs the learning using two or more different data sets having similarity.

(16)
The information processing device according to (15), in which
the two or more different data sets having similarity are data sets having different labeling rules from each other.

(17)
The information processing device according to any one of (14) to (16), in which
the learning unit performs learning through semi-supervised learning or domain adaptation.

(18)
The information processing device according to any one of (1) to (17), further including:
a learning data input unit configured to perform dimensionality reduction on the learning data for input to the data distribution presentation unit.

(19)
The information processing device according to any one of (1) to (18), in which
the learning performance prediction unit predicts the learning performance on a basis that labeling of the learning data has been executed.

(20)
An information processing method including:
performing, by a processor, dimensionality reduction based on input learning data to generate a data distribution diagram related to the learning data;
predicting, by the processor, learning performance on the basis of the data distribution diagram and a labeling status related to the learning data; and
controlling, by the processor, a display related to the data distribution diagram and the learning performance, in which
the data distribution diagram includes overlap information about clusters including the learning data and information about the number of pieces of the learning data belonging to each of the clusters.

REFERENCE SIGNS LIST 10 data collection device
110 input unit
120 sensor unit
130 storage unit
140 output unit
150 communication unit
20 information processing server
210 learning data input unit
220 data distribution presentation unit
230 labeling candidate selection unit
240 labeling execution unit
250 learning performance prediction unit
260 display control unit
270 communication unit
30 information processing terminal
310 input unit
320 output unit
330 communication unit
40 learning device
410 learning unit
420 recognizer output unit
430 communication unit

The invention claimed is:
1. An information processing device comprising:
a processor configured to:
perform dimensionality reduction on input learning data to generate a data distribution diagram related to the input learning data;
select a labeling candidate from the input learning data based on the data distribution diagram, wherein
the input learning data positioned close to a center of gravity of a cluster of the data distribution diagram is selected as the labeling candidate;
predict learning performance based on the data distribution diagram and a labeling status related to the input learning data; and control a display related to the data distribution diagram, the selected labeling candidate, and the learning performance, wherein
the data distribution diagram includes overlap information about clusters including the input learning data and information about a number of pieces of the input learning data belonging to each of the clusters.

2. The information processing device according to claim 1, wherein
in a case where labeled learning data belonging only to a single cluster exists, the processor is further configured to predict that unlabeled learning data belonging only to the cluster is classified into a class identical to the labeled learning data.

3. The information processing device according to claim 1, wherein
in a case where, in a certain cluster, labeled learning data belonging only to the cluster does not exist, the processor is further configured to predict that a probability at which unlabeled learning data belonging only to the cluster is classified into a correct class is in proportion to a reciprocal of a number of all the clusters.

4. The information processing device according to claim 1, wherein
the processor is further configured to predict that a probability at which unlabeled learning data belonging to a common portion of the clusters is classified into a correct class is in proportion to a reciprocal of a number of the clusters that form the common portion.

5. The information processing device according to claim 1, wherein the processor is further configured to:
predict the learning performance in a case where labelled learning data belonging only to each of the clusters exists in all of the clusters as maximum learning performance; and
cause a number of the clusters and the maximum learning performance to be displayed in association.

6. The information processing device according to claim 5, wherein the processor is further configured to:
generate a plurality of data distribution diagrams, including the data distribution diagram, different in the number of the clusters;
predict the maximum learning performance at each number of the clusters based on the plurality of data distribution diagrams; and
cause a comparison in the maximum learning performance among respective numbers of the clusters to be displayed.

7. The information processing device according to claim 6, wherein the processor is further configured to:
determine an optimum number of the clusters based on the number of the clusters and the maximum learning performance at the number of the clusters; and
generate the data distribution diagram based on the optimum number of the clusters.

8. The information processing device according to claim 1, wherein
the processor is further configured to, based on learning data selected in the data distribution diagram and an input value, perform labeling of the input learning data.

9. The information processing device according to claim 8, wherein
based on the selected learning data, the processor is further configured to cause reference information corresponding to the selected learning data to be displayed.

10. The information processing device according to claim 9, wherein
the processor is further configured to cause the reference information and accompanying data synchronized with the reference information to be displayed in association.

11. The information processing device according to claim 1, wherein
based on the data distribution diagram and newly input learning data, the processor is further configured to make a determination about whether or not labeling related to the input learning data is necessary.

12. The information processing device according to claim 11, wherein
based on the determination about whether or not the labeling is necessary, the processor is further configured to cause a user interface, that prompts for labeling of the newly input learning data, to be displayed.

13. The information processing device according to claim 1, wherein
the processor is further configured to perform learning based on the input learning data.

14. The information processing device according to claim 13, wherein
the processor is further configured to perform the learning using two or more different data sets having similarity.

15. The information processing device according to claim 14, wherein
the two or more different data sets having similarity are data sets having different labeling rules from each other.

16. The information processing device according to claim 13, wherein
the processor is further configured to perform the learning through semi-supervised learning or domain adaptation.

17. The information processing device according to claim 1, wherein
the processor is further configured to predict the learning performance based on an execution of labeling of the input learning data.

18. An information processing method comprising:
performing, by a processor, dimensionality reduction based on input learning data to generate a data distribution diagram related to the input learning data;
selecting, by the processor, a labeling candidate from the input learning data based on the data distribution diagram, wherein
the input learning data positioned close to a center of gravity of a cluster of the data distribution diagram is selected as the labeling candidate;
predicting, by the processor, learning performance based on the data distribution diagram and a labeling status related to the input learning data; and
controlling, by the processor, a display related to the data distribution diagram, the selected labeling candidate, and the learning performance, wherein
the data distribution diagram includes overlap information about clusters including the input learning data and information about a number of pieces of the input learning data belonging to each of the clusters.

19. An information processing device comprising:
a processor configured to:
perform dimensionality reduction on input learning data to generate a data distribution diagram related to the input learning data;

predict learning performance based on the data distribution diagram and a labeling status related to the input learning data;
make a determination about whether or not labeling related to the input learning data is necessary based on the data distribution diagram and newly input learning data; and
control a display related to the data distribution diagram and the learning performance, wherein
the data distribution diagram includes overlap information about clusters including the input learning data and information about a number of pieces of the input learning data belonging to each of the clusters, and
a user interface, that prompts for labeling of the newly input learning data, is displayed based on the determination about whether or not the labeling is necessary.

* * * * *